United States Patent
Oami et al.

(10) Patent No.: US 9,367,616 B2
(45) Date of Patent: Jun. 14, 2016

(54) VIDEO DESCRIPTOR GENERATION DEVICE

(75) Inventors: Ryoma Oami, Tokyo (JP); Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 940 days.

(21) Appl. No.: 13/144,758

(22) PCT Filed: Jan. 20, 2010

(86) PCT No.: PCT/JP2010/000276
§ 371 (c)(1),
(2), (4) Date: Jul. 15, 2011

(87) PCT Pub. No.: WO2010/084737
PCT Pub. Date: Jul. 29, 2010

(65) Prior Publication Data
US 2011/0274355 A1    Nov. 10, 2011

(30) Foreign Application Priority Data
Jan. 23, 2009 (JP) .................... 2009-012812

(51) Int. Cl.
G06K 9/46 (2006.01)
G06F 17/30 (2006.01)
G06K 9/00 (2006.01)
G06K 9/50 (2006.01)

(52) U.S. Cl.
CPC .... *G06F 17/30781* (2013.01); *G06F 17/30256* (2013.01); *G06F 17/30799* (2013.01); *G06F 17/30825* (2013.01); *G06K 9/00744* (2013.01); *G06K 9/4642* (2013.01); *G06K 9/50* (2013.01)

(58) Field of Classification Search
None
See application file for complete search history.

(56) References Cited

U.S. PATENT DOCUMENTS

| 7,248,782 B2* | 7/2007 | Kasutani ................. 386/241 |
| 7,809,058 B2* | 10/2010 | Dambrackas ............ 375/240.01 |
| 2003/0197897 A1* | 10/2003 | Iwasaki et al. ........... 358/3.03 |
| 2004/0148640 A1 | 7/2004 | Masukura et al. |
| 2007/0030519 A1 | 2/2007 | Tojo |
| 2008/0212899 A1* | 9/2008 | Gokturk et al. ............ 382/305 |
| 2009/0080800 A1* | 3/2009 | Moraleda et al. ......... 382/276 |
| 2009/0304271 A1* | 12/2009 | Takahashi ............ G06T 7/0081 382/165 |
| 2009/0324199 A1* | 12/2009 | Haitsma et al. ............. 386/95 |
| 2010/0049711 A1* | 2/2010 | Singh et al. ................. 707/6 |
| 2010/0246955 A1* | 9/2010 | Wright et al. .............. 382/173 |

FOREIGN PATENT DOCUMENTS

| JP | 10-320400 A | 12/1998 |
| JP | 2003-122758 A | 4/2003 |

(Continued)

OTHER PUBLICATIONS

Extended European Search Report dated Aug. 2, 2012, issued by the European Patent Office in counterpart Application No. 10733345.2.

(Continued)

*Primary Examiner* — Sumati Lefkowitz
*Assistant Examiner* — David Perlman
(74) *Attorney, Agent, or Firm* — Sughrue Mion, PLLC

(57) ABSTRACT

The video descriptor generation device includes a first extraction unit, a second extraction unit, and a feature combining unit. The first extraction unit extracts a first feature for each picture which is a frame or a field of a video. The second extraction unit extracts a second feature from a region defined by an edge of an image included in the video. The feature combining unit combines the first feature and the second feature to generate a video descriptor.

27 Claims, 27 Drawing Sheets

(56) References Cited

FOREIGN PATENT DOCUMENTS

| JP | 2004-172671 | A | | 6/2004 | |
|---|---|---|---|---|---|
| JP | 2007-047943 | A | | 2/2007 | |
| JP | WO2008018398 | | * | 2/2008 | ................ G06T 7/00 |
| WO | 2007/091243 | A2 | | 8/2007 | |
| WO | 2007/091243 | A3 | | 8/2007 | |
| WO | 2007/148264 | A1 | | 12/2007 | |
| WO | 2008/066930 | A2 | | 6/2008 | |
| WO | 2008/066930 | A3 | | 6/2008 | |
| WO | 2010/084737 | A1 | | 7/2010 | |

OTHER PUBLICATIONS

Chi-Yoon Jeong, et al., "Appearance-Based Nude Image Detection", Proceedings of the 17th International Conference on Pattern Recognition, vol. 4, XP010723961, Aug. 23, 2004, 4 pgs.
Sheng-Yang Dai, et al. "Unbalanced region matching based on two-level description for image retrieval", Pattern Recognition Letters, vol. 26, No. 5, XP027779869, Apr. 1, 2005, pp. 565-580.
Kota Iwamoto, et al., "CE report for VCE-7 on video signature", NEC, XP030043076, Apr. 23, 2007, 4 pgs.
Paul Brasnett, et al., "Study of Working Draft 15938-3:2002/Amd. 4 Video Signature Tools", Mitsubishi Electric R&D Centre Europe, NEC Corporation, XP030045295, Jun. 25, 2009, 24 pgs.
Starvros Paschalakis, et al., "The MPEG-7 Video Signature Tools for Content Identification", IEEE Transactions on Circuits and Systems for Video Technology, vol. 22, No. 7, Jul. 1, 2012, pp. 1050-1063.
Extended European Search Report dated Aug. 1, 2012, issued by the European Patent Office in counterpart Application No. 11189661.9.
Yongdong Zhang, et al., TRECVID 2008 Content-Based Copy Detection by MCG-ICT-CAS*", TRECVID 2008 Workshop, XP55033640, Nov. 18, 2008, 3 pgs.
Office Action, dated Jan. 7, 2014, issued by the Japanese Patent Office, in counterpart Application No. 2011-262738.

* cited by examiner

VIDEO DESCRIPTOR GENERATION DEVICE

CROSS REFERENCE TO RELATED APPLICATION

This application is a National Stage of International Application No. PCT/JP2010/000276 filed on Jan. 20, 2010, which claims priority from Japanese Patent Application No. 2009-012812, filed on Jan. 23, 2009, the contents of all of which are incorporated herein by reference in their entirety.

TECHNICAL FIELD

The present invention relates to video descriptor generation devices, video descriptor generation methods, and video descriptor generation programs, for retrieving videos, which are capable of detecting similar or identical moving image segments among a plurality of moving images.

BACKGROUND ART

An example of a video descriptor generation device is disclosed in Patent Document 1. FIG. 27 is a block diagram showing a video descriptor generation device described in Patent Document 1.

An each-frame feature extraction unit 10 calculates a frame unit feature from an input video, and outputs it to a feature table creation unit 20. The feature table creation unit 20 creates a feature table from the frame unit feature output from the each-frame feature extraction unit 10, and outputs the feature table as a video descriptor.

Next, operation of the device shown in FIG. 27 will be described.

The each-frame feature extraction unit 10 performs a process of extracting a feature such as the color of each frame from an input video, and outputs the obtained feature to the feature table creation unit 20 as a frame unit feature.

The feature table creation unit 20 performs processing on variations in the feature between frames using a threshold, and compresses the feature in a time direction. Specifically, the feature table creation unit 20 calculates a difference between the frame unit features of frames, and determines whether or not the difference is within a certain allowable variation range. Then, the feature table creation unit 20 divides the video into time segments in which the video is within the allowable variation range, and for each of the divided time segments, a set of the feature and the time segment length (the number of frames) is output as a video descriptor.

As such, the feature of the video obtained for each frame can be compressed in a time direction, whereby the feature size can be reduced. Further, high-speed matching can also be realized.

Patent Document 1: Japanese Unexamined Patent Publication No. 10-320400

SUMMARY

However, the above system involves the following problems.

A first problem is that the retrieval accuracy is lowered when black bar regions or an L-shaped region is added around the video, because there is no means for performing feature extraction while detecting addition of the black bar regions or the L-shaped region. As such, even if black regions (hereinafter referred to as black bar regions) are inserted on top and bottom or right and left portions of the screen due to aspect conversion between 4:3 and 16:9, or when an L-shaped region is added for emergency flash report or the like, features are directly extracted without considering such a matter. As a result, as features are extracted including unnecessary black bar regions or an L-shaped region, the values of the features differ from the case of not including such regions, which deteriorates the retrieval accuracy.

OBJECT OF THE INVENTION

An object of the present invention is to provide a video descriptor generation device, a video descriptor generation method, and a video descriptor generation program, capable of maintaining retrieval accuracy even if black bar regions or an L-shaped region is added to a video.

According to an aspect of the present invention, a video descriptor generation device includes a first extraction unit that extracts a first feature for each picture which is a frame or a field of a video; a second extraction unit that extracts a second feature from a region defined by an edge of an image included in the video; and a feature combining unit that combines the first feature and the second feature to generate a video descriptor.

As the present invention is configured as described above, the present invention has an advantageous effect that retrieval accuracy can be maintained even if black bar regions or an L-shaped region is added to a video.

EXEMPLARY EMBODIMENTS

Next, embodiments of the present invention will be described in detail with reference to the drawings.

Figure 1:
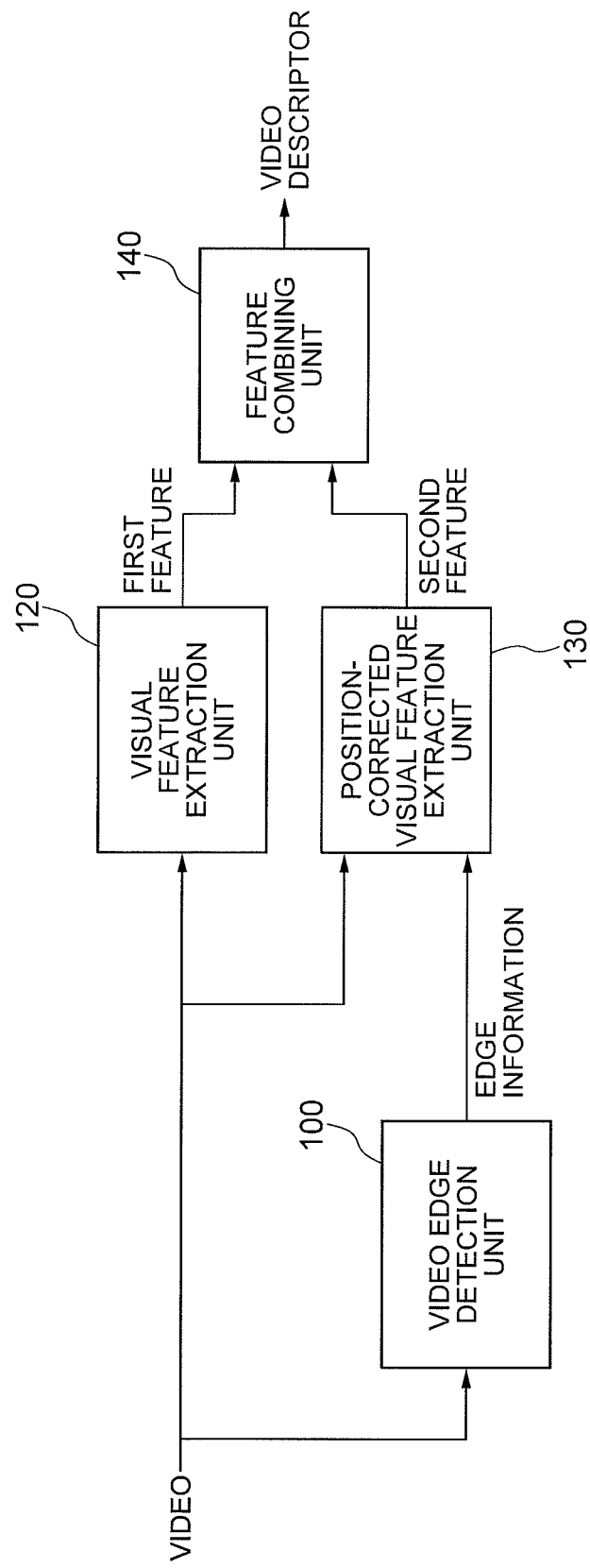
FIG. 1 is a block diagram showing the configuration of a first embodiment of a video descriptor generation device according to the present invention.

Referring to FIG. 1 showing a video descriptor generation device of a first embodiment of the present invention, the device includes a video edge detection unit 100, a visual feature extraction unit 120, a position-corrected visual feature extraction unit 130, and a feature combining unit 140.

The video edge detection unit 100 calculates a video edge from a video, and outputs edge information to the position-corrected visual feature extraction unit 130. The visual feature extraction unit 120 receives the video, obtains a first feature from the video, and outputs it to the feature combining unit 140. The position-corrected visual feature extraction unit 130 obtains a second feature from the edge information output from the video edge detection unit 100 and the video, and outputs it to the feature combining unit 140. The feature combining unit 140 calculates a video descriptor from the first feature and the second feature, and outputs it.

Next, operation of the first embodiment shown in FIG. 1 will be described in detail.

First, a video is input to the visual feature extraction unit 120. If the original video is encoded, the video is first decoded by a decoder, and then the data is input in picture units composed of frames or fields.

The visual feature extraction unit 120 calculates a feature vector of each picture. The visual feature extraction unit 120 considers a picture as one still image, and extracts a vector of visual features indicating features such as colors, patterns, shapes, and the like of this picture. The calculated feature vector is output to the feature combining unit 140 as a first feature.

On the other hand, the video is also input to the video edge detection unit 100. The video edge detection unit 100 detects whether or not there are black bar regions or an L-shaped region which are not originally included in the video, and if there is one, obtains the edge region thereof.

Figure 24:
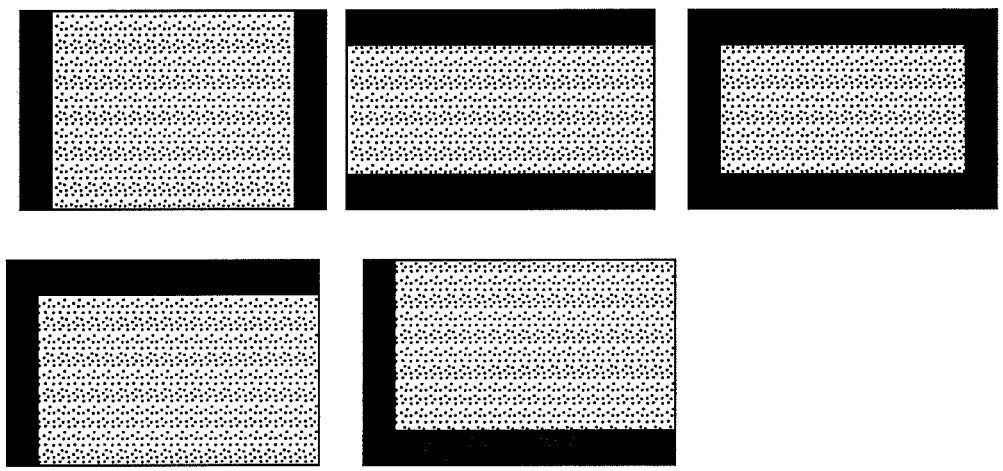
FIG. 24 shows examples of black bar regions and L-shaped regions.

It should be noted that black bar regions mean black extra regions inserted in top and bottom or right and left portions of the screen due to aspect conversion between 4:3 and 16:9. Although it is typically in black color, it is not necessarily black. On the other hand, an L-shaped (or inverse L-shaped) region is a video display technique used for broadcasting emergency news and the like, in which the actual video is slightly contracted to generate a space for broadcasting flash news. In that case, the color thereof is not black, usually. In either case, it is common that a region which is not in the original video is displayed. Examples of these regions are shown in FIG. 24. In FIG. 24, black regions correspond to black bar regions or L-shaped regions. Other than those regions, this category also includes such cases as the case of a video presenting technique of incorporating another image into an image, which is so-called Picture in Picture, and the case of capturing by a camera a video shown on the back screen of a anchorperson, as a frame appears around the main video. As such, by handling outside of the region which is displayed inside by Picture in Picture and outside of the frame of a screen in the same manner as the case of black bar regions, the method of present invention can be applied thereto.

The video edge detection unit 100 obtains such regions included in the picture, which have not been included in the original video, and the boundaries thereof. For example, it is possible to calculate the boundaries by applying Hough transform to the picture to detect linear components of the video, and obtaining linear components appearing at the same position within the picture in a temporarily continuous manner. Information describing the obtained video edges is output as edge information to the position-corrected visual feature extraction unit 130. As the edge information, it is possible to use a distance from an edge of the actual screen to the edge generated by a black bar region or an L-shaped region, for example. If bar regions only exist in top and bottom portions, the distance value to the boundaries of right and left should be set to 0. If an edge which is slightly tilted is also allowed, the angle thereof may be described together. Further, the edge information is also possible to include symbols indicating the type of a black bar or an L-shaped region, such as an L shape, a horizontal black bar, and a vertical black bar, and parameters necessary for describing the bar regions of each pattern. For example, if the width of a portion where an L shape appears has been set to several types, the edge information should include a symbol representing the L-shape pattern and an index designating the width.

To the position-corrected visual feature extraction unit 130, the video is also input in picture units, along with the edge information. The position-corrected visual feature extraction unit 130 calculates features without regarding the region outside the position defined by the edge information. This means that features are extracted on the supposition that the region inside the position defined by the edge information is the entire image. The feature to be extracted is the same as that extracted by the visual feature extraction unit 120. For example, if the visual feature extraction unit 120 extracts a layout feature of color, the position-corrected visual feature extraction unit 130 also extracts a layout feature of color. The extracted feature is output as a second feature to the feature combining unit 140.

The feature combining unit 140 combines the first feature output from the visual feature extraction unit 120 and the second feature output from the position-corrected visual feature extraction unit 130 to generate a video descriptor, and outputs it. In this example, both features may be simply combined to form one feature, or applied with particular encoding. It is also possible to encode the difference utilizing the fact that the first feature and the second feature have high correlation. This operation will be described below in detail.

Next, an embodiment of the feature combining unit 140 will be described with reference to FIG. 3.

Figure 3:
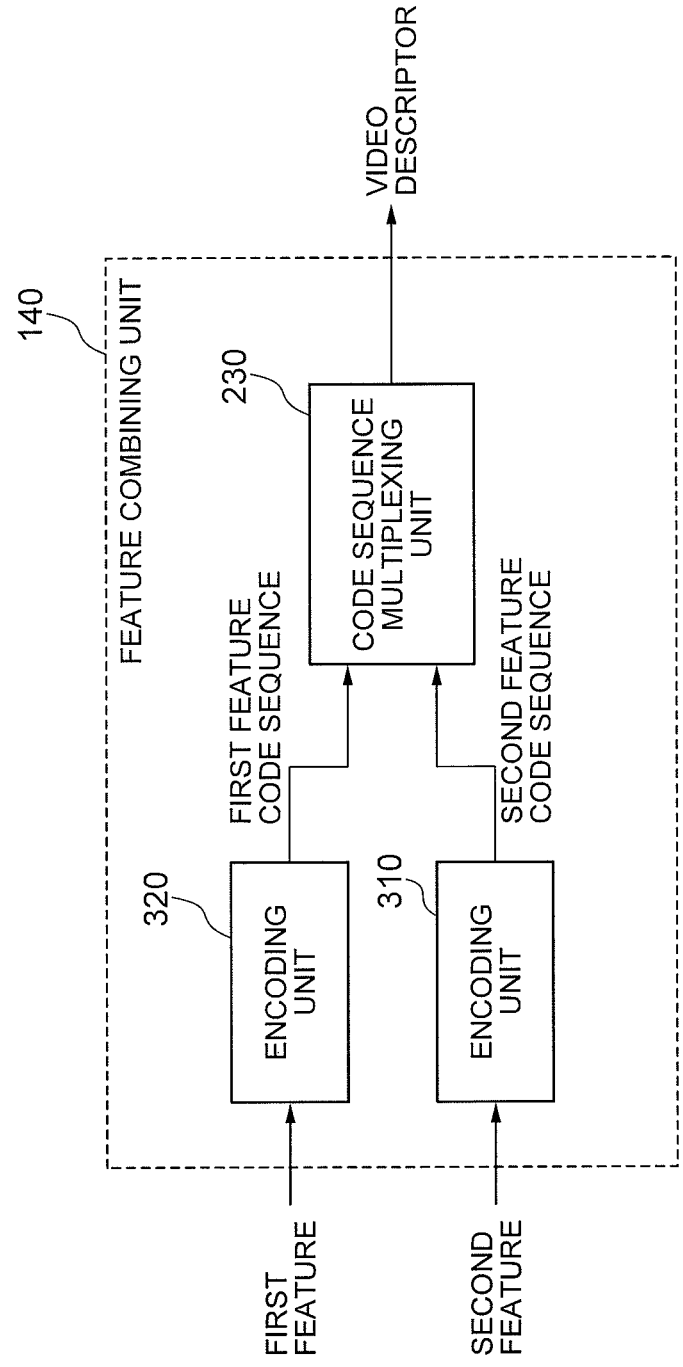
FIG. 3 is a block diagram showing the configuration of an embodiment of a feature combining unit 140 shown in FIG. 1.

Referring to FIG. 3 showing an embodiment of the feature combining unit 140, the feature combining unit 140 includes an encoding unit 310, an encoding unit 320, and a code sequence multiplexing unit 230.

The encoding unit 320 encodes an input first feature, and outputs a first feature code sequence obtained therefrom to the code sequence multiplexing unit 230. The encoding unit 310 encodes an input second feature and outputs a second feature code sequence obtained therefrom to the code sequence multiplexing unit 230. The code sequence multiplexing unit 230 multiplexes the first feature code sequence and the second feature code sequence to generate a video descriptor, and outputs it.

Next, operation of the feature combining unit 140 shown in FIG. 3 will be described.

First, a first feature is input to the encoding unit 320. The encoding unit 320 encodes the feature and generates a first feature code sequence. Here, encoding means storing information in a predetermined format, including simply aligning the values of a feature vector according to the dimensions. For example, if an input vector is an integer vector in N dimensions, a format in which N pieces of integer values of the respective dimensions are aligned is acceptable. If an input vector has a float value, it is possible to perform quantization to express it as representative values of a limited number and align the indexes (quantization indexes) indicating the representative values. Further, it is also possible to perform entropy coding considering the appearance frequency of the respective values on the obtained integer values or representative values. As the entropy coding, Huffman coding or arithmetic coding may be used. If there is correlation between dimensions of the feature vector, it is possible to perform entropy coding after performing a process of removing the correlation. For example, it is possible to obtain a difference of values between dimensions having correlation to perform difference encoding, or perform quantization or entropy coding after performing frequency conversion or the like on the input feature vector to generate a code sequence. Further, as a feature vector, if there is correlation between pictures, it is possible to calculate a difference from the feature vector of a past picture and encode it by means of the above encoding method to generate a code sequence. The generated first feature code sequence is output to the code sequence multiplexing unit 230.

On the other hand, the second feature is input to the encoding unit 310. Operation of the encoding unit 310 is the same as that of the encoding unit 320. The encoding unit 310 encodes the second feature to generate a second feature code sequence. The generated second feature code sequence is output to the code sequence multiplexing unit 230.

Figure 25:
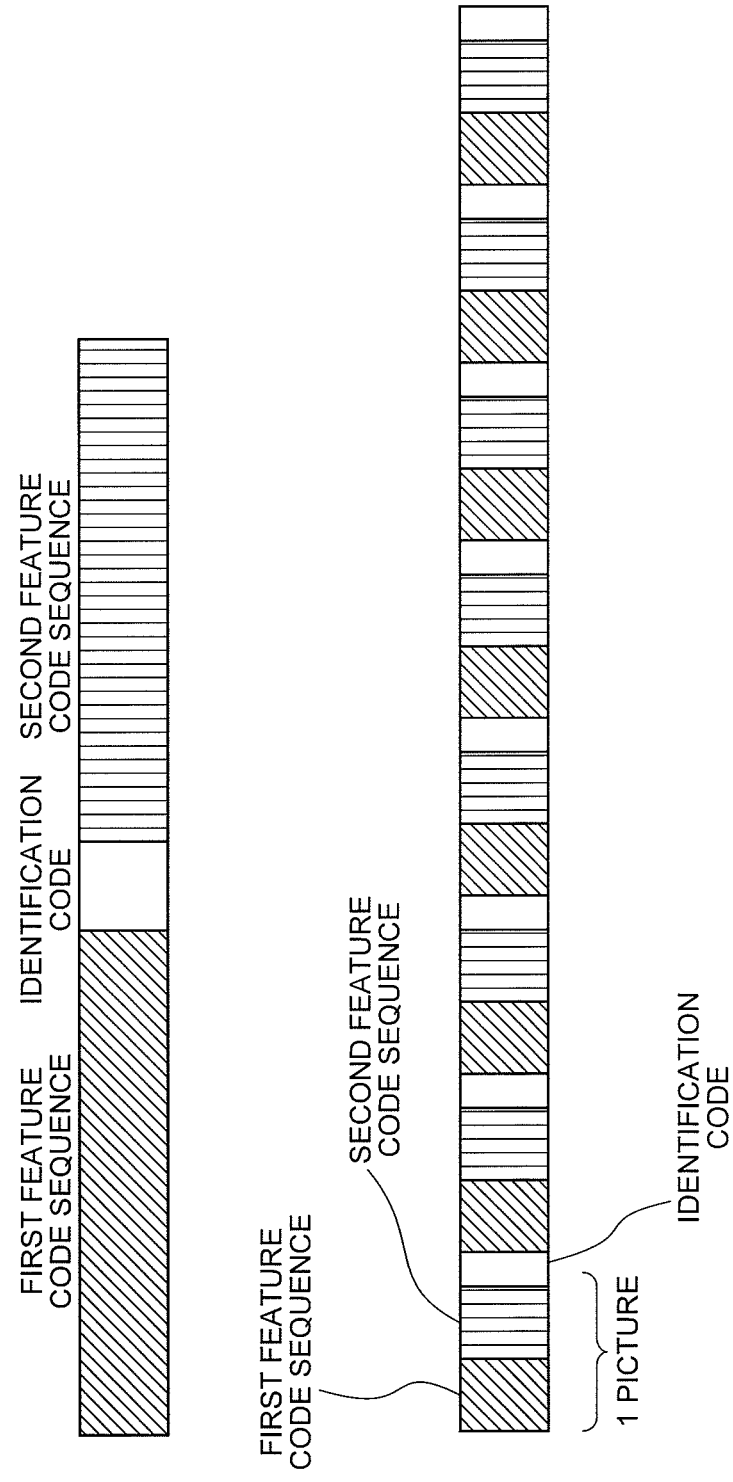
FIG. 25 shows examples of multiplexing feature code sequences.

The code sequence multiplexing unit 230 multiplexes the first feature code sequence and the second feature code sequence to thereby generate a video descriptor. As shown in FIG. 25, it is possible to simply integrating the first feature code sequence and the second feature code sequence with an identification code, which is used to specify a separable position, between them (however if the code sequences are in a fixed length or the length of the code sequence are described in somewhere, a code for identification is unnecessary), or constructing a video descriptor by alternately interleaving them in picture units.

With the feature combining unit 140 shown in FIG. 3, it is possible to generate a video description having both features obtained by performing feature extraction eliminating the black bar regions and features obtained by performing feature extraction using the entire screen.

Next, another embodiment of the feature combining unit 140 will be described with reference to FIG. 4.

Figure 4:
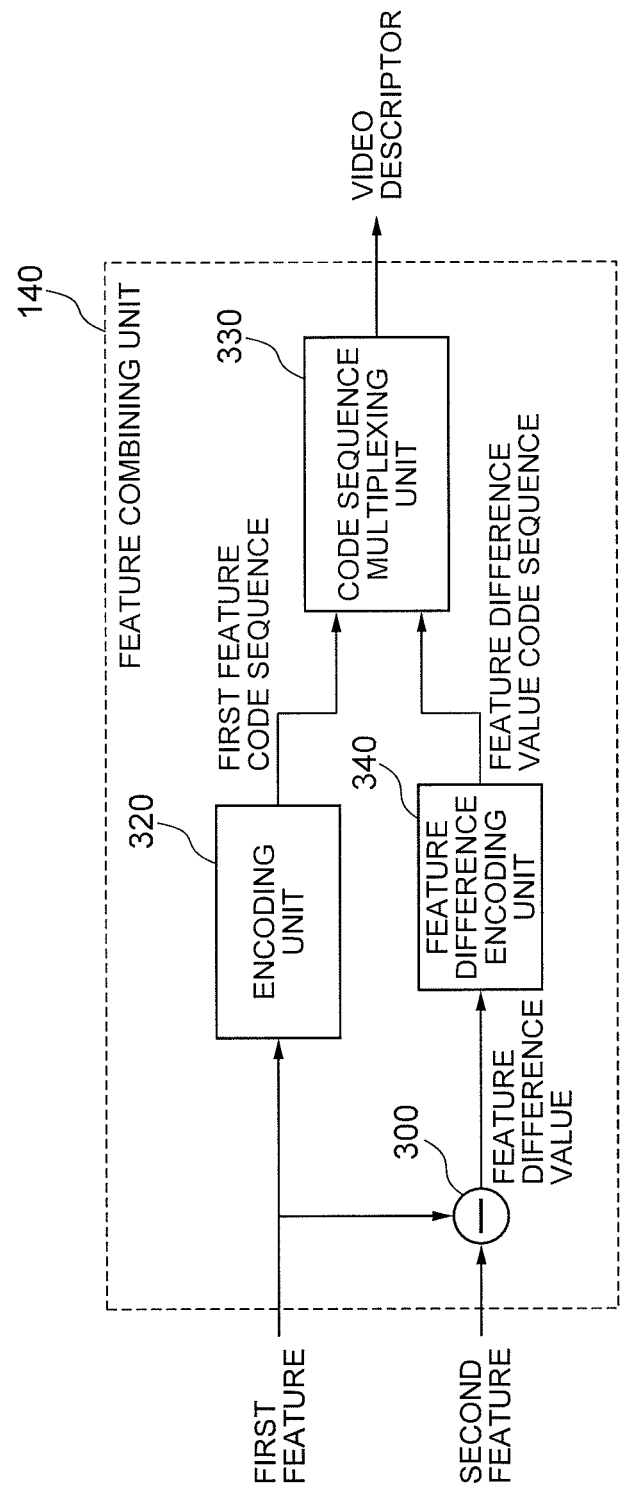
FIG. 4 is a block diagram showing the configuration of an embodiment of the feature combining unit 140 shown in FIG. 1.

Referring to FIG. 4 showing an embodiment of the feature combining unit 140, the feature combining unit 140 includes a feature subtraction unit 300, an encoding unit 320, a feature difference encoding unit 340, and a code sequence multiplexing unit 330.

The feature subtraction unit 300 subtracts the first feature from the second feature to calculate a difference between the features, and outputs a feature difference value to the feature difference encoding unit 340. The encoding unit 320 encodes the first feature, and outputs the obtained first feature code sequence to the code sequence multiplexing unit 330. The feature difference encoding unit 340 encodes the feature difference value output from the feature subtraction unit 300, and outputs the feature difference value code sequence to the code sequence multiplexing unit 330. The code sequence multiplexing unit 330 generates a video descriptor from the first feature code sequence output from the encoding unit 320 and the feature difference value code sequence output from the feature difference encoding unit 340, and outputs it.

Next, operation of the feature combining unit 140 shown in FIG. 4 will be described.

First, the first feature is input to the encoding unit 320. Operation of the encoding unit 320 is the same as that shown in FIG. 3, and the first feature code sequence is output to the code sequence multiplexing unit 330. The first feature is also input to the feature subtraction unit 300. The second feature is also input to the feature subtraction unit 300.

In the feature subtraction unit 300, the first feature is subtracted from the second feature for each dimension of the feature vector, whereby a difference vector is calculated. The difference vector is output to the feature difference encoding unit 340 as a feature difference value.

The feature difference encoding unit 340 encodes the feature difference value to generate a feature difference value code sequence. As the first feature and the second feature are extracted from originally the same video with a difference in whether or not to include black bar regions or an L-shaped region, they have a large correlation. As such, it is considered that if differences between both features are calculated, distribution of the appeared values concentrates on the neighborhood of 0. By using this characteristic, it is possible to reduce the quantity of codes generated by performing entropy coding. Specifically, it is possible to calculate frequency distribution of difference values beforehand using learning data with respect to each dimension of the feature vector, and apply arithmetic coding to the difference values using the distribution. It is also possible to construct a Huffman coding table based on the frequency distribution, and encode the difference values based on the table. If the feature difference values concentrate on almost 0, it is also possible to construct a code sequence as a combination of an index of a dimension having a value other than 0 and a code indicating the non-zero value. The generated feature difference value code sequence is output to the code sequence multiplexing unit 330.

The code sequence multiplexing unit 330 integrates the first feature code sequence and the feature difference value code sequence to generate a video descriptor. Operation thereof is the same as that of the code sequence multiplexing unit 230 shown in FIG. 3.

With the feature combining unit 140 shown in FIG. 4, by performing encoding after calculating the differences, it is possible to reduce the size of the features.

Next, another embodiment of the feature combining unit 140 will be described with reference to FIG. 6.

Figure 6:
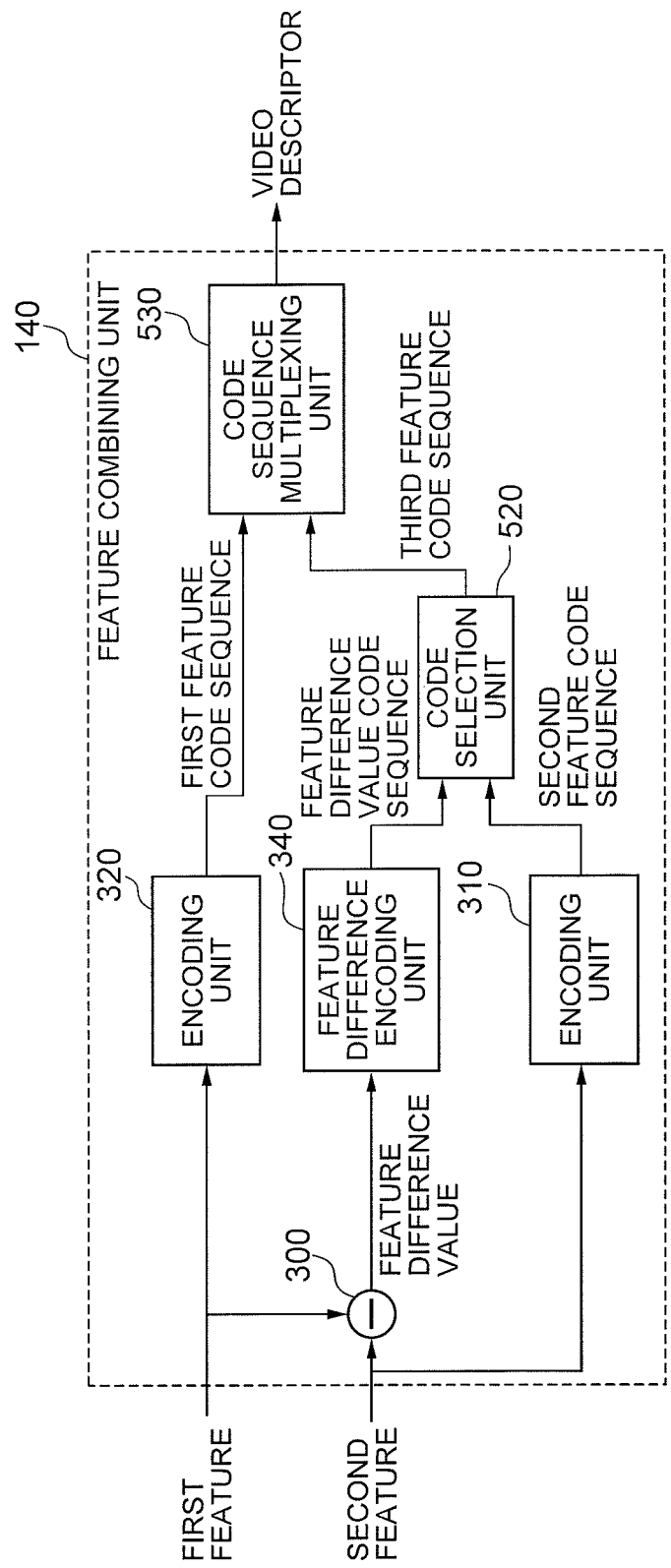
FIG. 6 is a block diagram showing the configuration of an embodiment of the feature combining unit 140 shown in FIG. 1.

Referring to FIG. 6 showing an embodiment of the feature combining unit 140, the feature combining unit 140 includes a feature subtraction unit 300, an encoding unit 310, an encoding unit 320, a feature difference encoding unit 340, a code selection unit 520, and a code sequence multiplexing unit 530.

The connection relation between the feature subtraction unit 300 and the encoding unit 320 is the same as that shown in FIG. 4. The feature difference encoding unit 340 encodes a feature difference value output from the feature subtraction unit 300, and outputs a feature difference value code sequence to the code selection unit 520. The encoding unit 310 encodes a second feature, and outputs a second feature code sequence to the code selection unit 520. The code selection unit 520 selects one of the feature difference value code sequence output from the feature difference encoding unit 340 and the second feature code sequence output from the encoding unit 310, and outputs it to the code sequence multiplexing unit 530 as a third feature code sequence. The code sequence multiplexing unit 530 generates a video descriptor from the first feature code sequence output from the encoding unit 320 and the third feature code sequence output from the code selection unit 520, and outputs it.

Next, operation of the feature combining unit 140 shown in FIG. 6 will be described.

Operation of the encoding unit 310 and the encoding unit 320 is the same as that shown in FIG. 3. Further, operation of the feature subtraction unit 300 and the feature difference encoding unit 340 is the same as that shown in FIG. 4. The feature difference value code sequence output from the feature difference encoding unit 340 and the second feature code sequence output from the encoding unit 310 are input to the code selection unit 520.

The code selection unit 520 compares the quantities of codes between the feature difference value code sequence and the second feature code sequence in each picture or in a unit of a plurality of pictures, selects a code sequence having smaller quantity of generated codes, and outputs it to the code sequence multiplexing unit 530 as a third feature code sequence. In this process, information indicating which way is used for coding is output, as mode information, to the code sequence multiplexing unit 530 in a picture unit or a unit of a plurality of pictures. The code sequence multiplexing unit 530 integrates the first feature code sequence and the third feature code sequence to generate a video descriptor. Although the operation thereof is almost similar to that of the code sequence multiplexing unit 230 shown in FIG. 3, the point that mode information is also included in the video descriptor is the difference.

As the feature combining unit 140 shown in FIG. 6 has a means for directly encoding the second feature, it is possible to prevent an increase in the feature size even in the case where the features largely differ depending on black bar regions or an L-shaped region so that encoding a feature difference value is inappropriate from a viewpoint of encoding efficiency.

The first embodiment of the video descriptor generation device has been described above. With the first embodiment, it is possible to extract a video descriptor capable of preventing deterioration in retrieval accuracy even in the case of including black bar regions or an L-shaped region. This is because the first embodiment detects black bar regions or an L-shaped region, and has information of the features extracted from the regions excluding the detected regions. As such, in the case of a moving image including black bar regions or an L-shaped region, retrieval accuracy can be maintained by comparing the features of the regions excluding those regions. Further, the first embodiment also has the features with respect to the entire video in which those regions are not removed. As such, even if there are any errors in detecting black bar regions or an L-shaped region, it is possible to perform matching between the features of entire images, whereby deterioration of the accuracy can be prevented.

Next, a second embodiment of the present invention will be described in detail.

Figure 2:
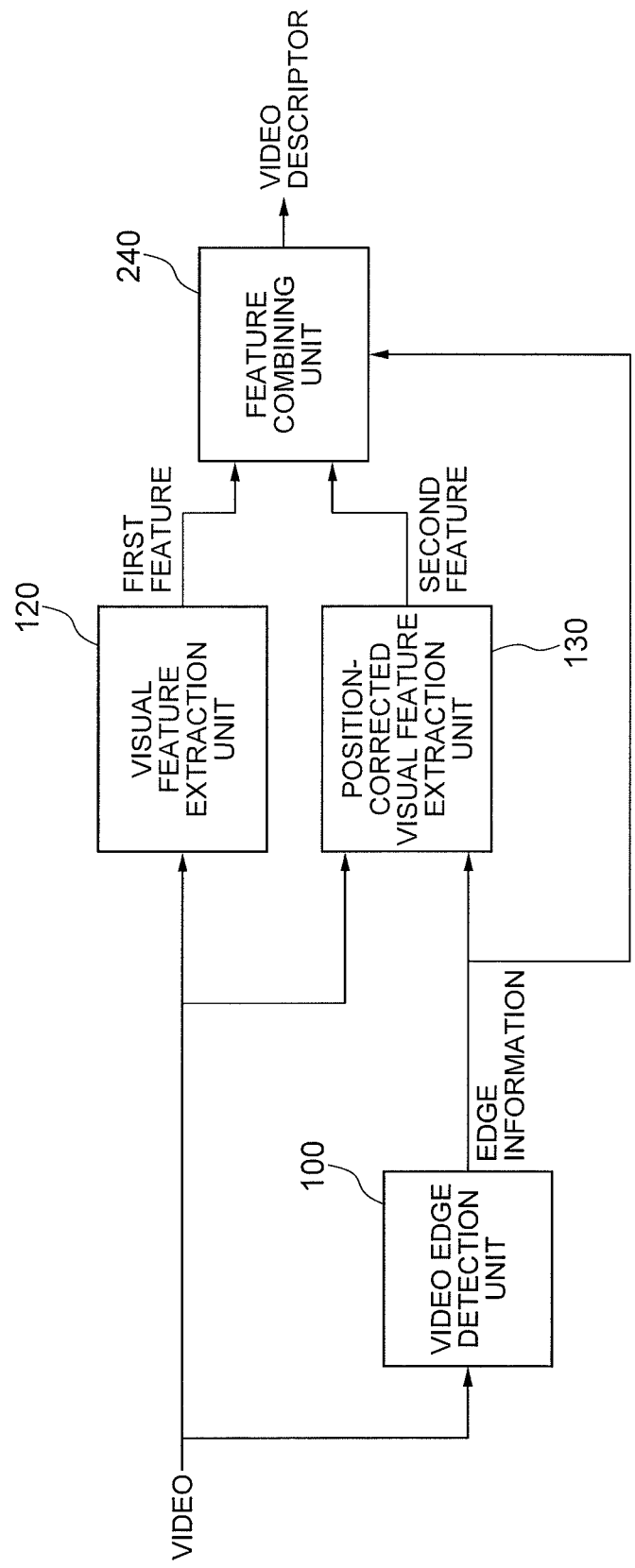
FIG. 2 is a block diagram showing the configuration of a second embodiment of a video descriptor generation device according to the present invention.

Referring to FIG. 2 showing a video descriptor generation device of the second embodiment, the device includes a video edge detection unit 100, a visual feature extraction unit 120, a position-corrected visual feature extraction unit 130, and a feature combining unit 240.

Although the configuration is almost similar to that shown in FIG. 1, an aspect that a feature combining unit 240 is used instead of the feature combining unit 140 and edge information output from the video edge detection unit 100 is also input to the feature combining unit 240 differs from the case of FIG. 1.

Next, operation of the second embodiment of the present invention shown in FIG. 2 will be described.

Operation of the video edge detection unit 100, the visual feature extraction unit 120, and the position-corrected visual feature extraction unit 130 is the same as that of the video descriptor generation device shown in FIG. 1. A first feature output from the visual feature extraction unit 120 and a second feature output from the position-corrected visual feature extraction unit 130 are input to the feature combining unit 240. Further, edge information output from the video edge detection unit 100 is also input to the feature combining unit 240.

While the operation of the feature combining unit 240 is also similar basically to that of the feature combining unit 140 shown in FIG. 1, an aspect of generating a video descriptor by controlling an encoding method by edge information and an aspect of including the edge information or its related information in the video descriptor differ from the case shown in FIG. 1. The details of these aspects will be described below.

Next, an embodiment of the feature combining unit 240 will be described with reference to FIG. 5.

Figure 5:
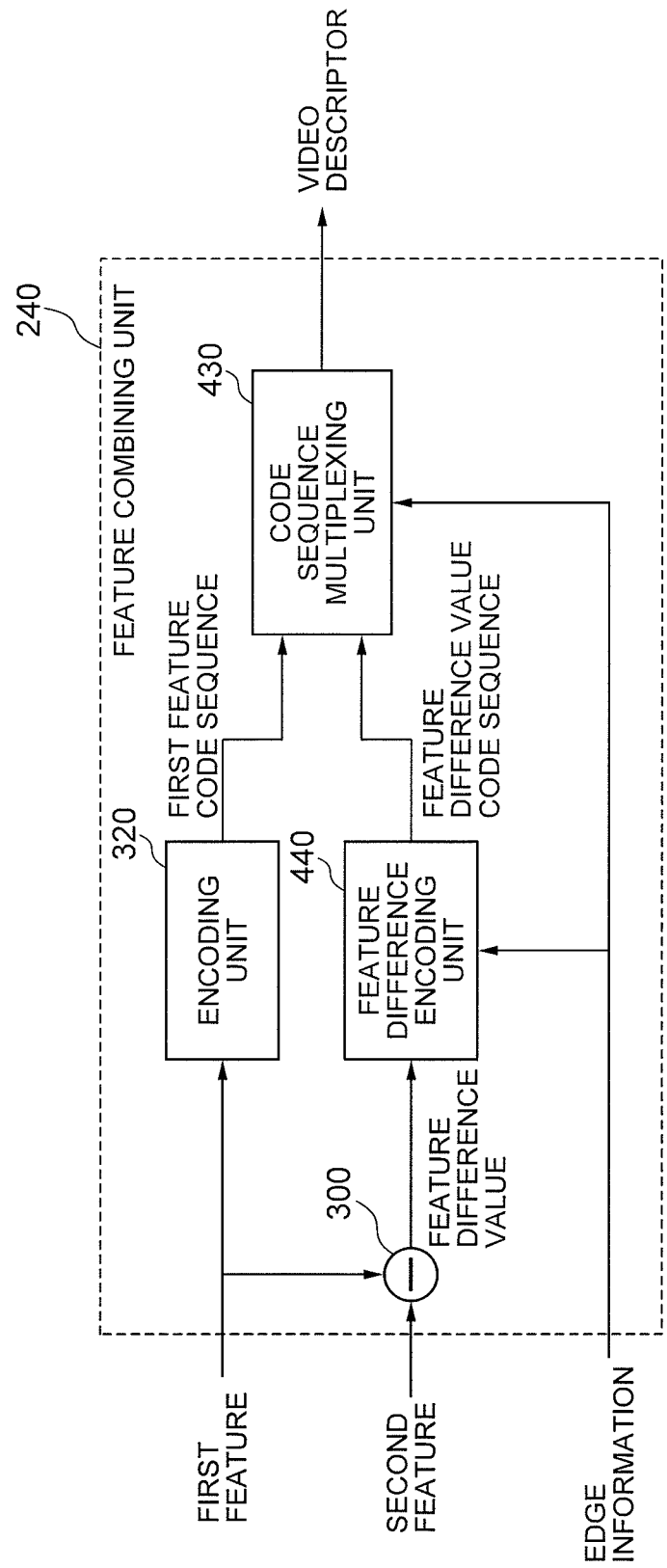
FIG. 5 is a block diagram showing the configuration of an embodiment of a feature combining unit 240 shown in FIG. 2.

Referring to FIG. 5 showing an embodiment of the feature combining unit 240, the feature combining unit 240 includes a feature subtraction unit 300, an encoding unit 320, a feature difference encoding unit 440, and a code sequence multiplexing unit 430.

The connection relation between the feature subtraction unit 300 and the encoding unit 320 is the same as that shown in FIG. 4. The feature difference encoding unit 440 encodes a feature difference value from the feature difference value output from the feature subtraction unit 300 and edge information, and outputs a feature difference value code sequence to the code sequence multiplexing unit 430. The code sequence multiplexing unit 430 generates a video descriptor from the first feature code sequence output from the encoding unit 320, the feature difference value code sequence output from the feature difference encoding unit 440, and the edge information, and outputs it.

Next, operation of the feature combining unit 240 shown in FIG. 5 will be described.

Operation of the feature subtraction unit 300 and the encoding unit 320 is the same as that shown in FIG. 4.

The feature difference encoding unit 440 encodes the feature difference value output from the feature subtraction unit 300 to generate a feature difference value code sequence. This operation is basically similar to the operation of the feature difference encoding unit 340 described in FIG. 4. However, the case of the feature difference encoding unit 440 differs from the case of the feature difference encoding unit 340 in that an encoding parameter is controlled by edge information indicating black bar regions or an L-shaped region. As such, an encoding parameter is changed according to edge information. Distribution of difference values in the respective dimensions of a feature vector is changed depending on the size of black bar regions or an L-shaped region, appearance location thereof, and the like. As such, entropy coding is performed by selecting distribution of difference values to be used according to the edge information to perform arithmetic coding according to the distribution, or selecting a Huffman table to be used according to the edge information to perform Huffman coding. The generated feature difference value code sequence is output to the code sequence multiplexing unit 430.

The code sequence multiplexing unit 430 generates a video descriptor by multiplexing a first feature code sequence output from the encoding unit 320, a feature difference value code sequence output from the feature difference encoding unit 440, and the edge information. While this operation is basically similar to that of the code sequence multiplexing unit 330 shown in FIG. 4, an aspect of multiplexing the edge information together differs. It should be noted that the edge information may be one obtained by encoding the information or indexing the information, rather than the information itself. For example, in the feature difference encoding unit 440, if encoding parameters to be used in a Huffman table or arithmetic coding are classified into some classes and one of them is selected, it is possible to multiplex an index identifying this class, or allocate a code which can specify this index.

With the feature combining unit 240 shown in FIG. 5, it is possible to optimize an encoding parameter for encoding after calculating a difference between features, whereby the encoding efficiency of the features can be improved.

Next, another embodiment of the feature combining unit 240 will be described with reference to FIG. 7.

Figure 7:
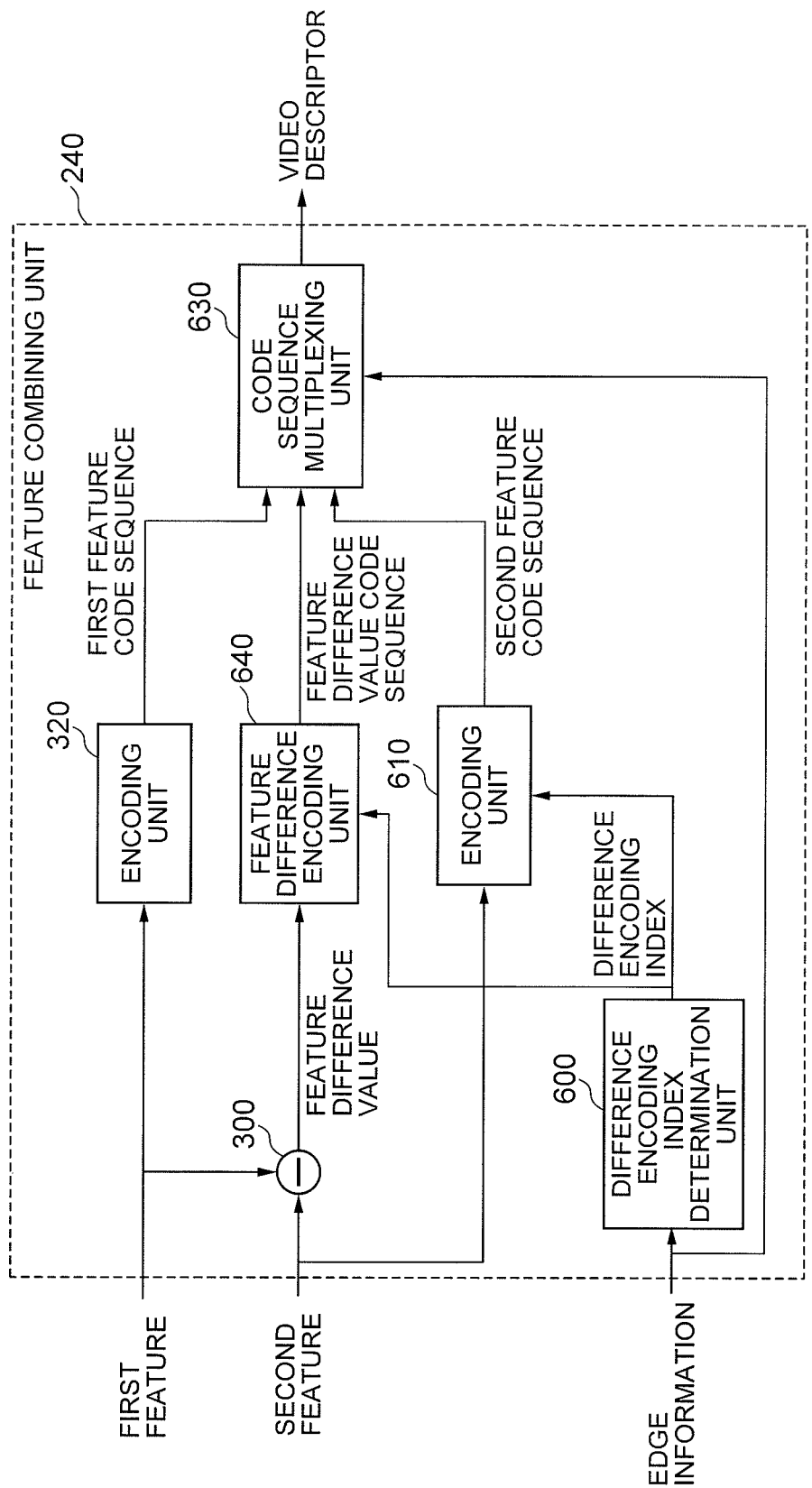
FIG. 7 is a block diagram showing the configuration of an embodiment of the feature combining unit 240 shown in FIG. 2.

Referring to FIG. 7 showing an embodiment of the feature combining unit 240, the feature combining unit 240 includes a feature subtraction unit 300, an encoding unit 320, a difference encoding index determination unit 600, an encoding unit 610, a feature difference encoding unit 640, and a code sequence multiplexing unit 630.

The connection relation between the feature subtraction unit 300 and the encoding unit 320 is the same as that shown in FIG. 4. The difference encoding index determination unit 600 receives edge information, and outputs difference encoding indexes to the feature difference encoding unit 640 and the encoding unit 610. The feature difference encoding unit 640 encodes a feature difference value output from the feature subtraction unit 300 based on the difference encoding indexes output from the difference encoding index determination unit 600, and outputs a feature difference value code sequence to the code sequence multiplexing unit 630. The encoding unit 610 encodes the second feature based on the difference encoding indexes output from the difference encoding index determination unit 600, and outputs a second feature code sequence to the code sequence multiplexing unit 630. The code sequence multiplexing unit 630 multiplexes the first feature code sequence output from the encoding unit 320, the feature difference value code sequence output from the feature difference encoding unit 640, the second feature code sequence output from the encoding unit 610, and the edge information to generate a video descriptor, and outputs it.

Next, operation of the feature combining unit 240 shown in FIG. 7 will be described.

Operation of the feature subtraction unit 300 and the encoding unit 320 is the same as that shown in FIG. 4.

The difference encoding index determination unit 600 determines dimensions for performing difference encoding, among the respective dimensions of the features, based on the input edge information, and outputs indexes indicating the dimensions as difference encoding indexes. The difference encoding indexes are output to the feature difference encoding unit 640 and the encoding unit 610.

The feature difference encoding unit 640 encodes feature difference values with respect to the dimensions corresponding to the input difference encoding indexes to generate a feature difference value code sequence. The method of encoding the feature difference value is the same as the feature difference encoding unit 340 shown in FIG. 4. The generated feature difference value code sequence is output to the code sequence multiplexing unit 630.

The encoding unit 610 encodes a second feature of dimensions not corresponding to the input difference encoding indexes to generate a second feature code sequence. The method of encoding the second feature is the same as that used by the encoding unit 310 shown in FIG. 3. The generated second feature code sequence is output to the code sequence multiplexing unit 630.

The code sequence multiplexing unit 630 multiplexes the first feature code sequence output from the encoding unit 320, the feature difference value code sequence output from the feature difference encoding unit 640, the second feature code sequence output from the encoding unit 610, and the edge information to thereby generate a video descriptor. The video descriptor may be generated by simply integrating those code sequences, or alternately interleaving them in picture units. Multiplexing of the edge information is the same as that performed by the code sequence multiplexing unit 430 shown in FIG. 5.

For some dimensions, it is preferable to encode differences between features, while it is not the case for other dimensions, and if it changes depending on edge information, it is possible to encode features more efficiently by the feature combining unit 240 shown in FIG. 7.

Next, another embodiment of the feature combining unit 240 will be described with reference to FIG. 8.

Figure 8:
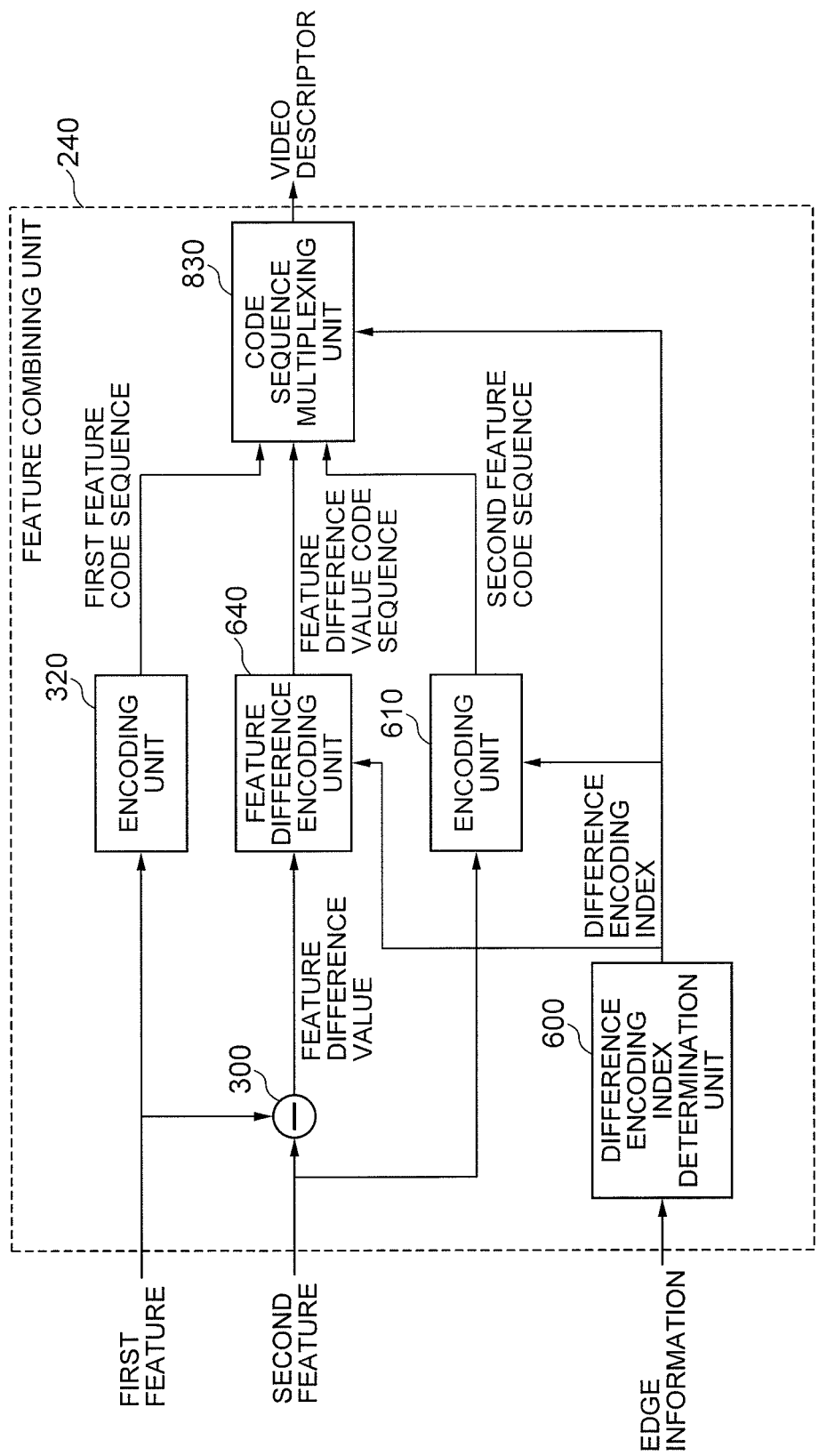
FIG. 8 is a block diagram showing the configuration of an embodiment of the feature combining unit 240 shown in FIG. 2.

Referring to FIG. 8 showing an embodiment of the feature combining unit 240, the feature combining unit 240 includes a feature subtraction unit 300, an encoding unit 320, a difference encoding index determination unit 600, an encoding unit 610, a feature difference encoding unit 640, and a code sequence multiplexing unit 830.

The configuration of the feature combining unit 240 is similar to the configuration shown in FIG. 7 except that a code sequence multiplexing unit 830 is used instead of the code sequence multiplexing unit 630, and that a difference encoding index is input to the code sequence multiplexing unit 830 instead of edge information.

Next, operation of the feature combining unit 240 will be described.

Operation of the unit other than the code sequence multiplexing unit 830 is the same as that shown in FIG. 7. The operation of the code sequence multiplexing unit 830 is also similar to that of the code sequence multiplexing unit 630 shown in FIG. 7 except for an aspect of multiplexing difference encoding indexes instead of edge information.

The feature combining unit 240 shown in FIG. 8 provides another embodiment having the same advantageous effect as that of FIG. 7.

Next, another embodiment of the feature combining unit 240 will be described with reference to FIG. 9.

Figure 9:
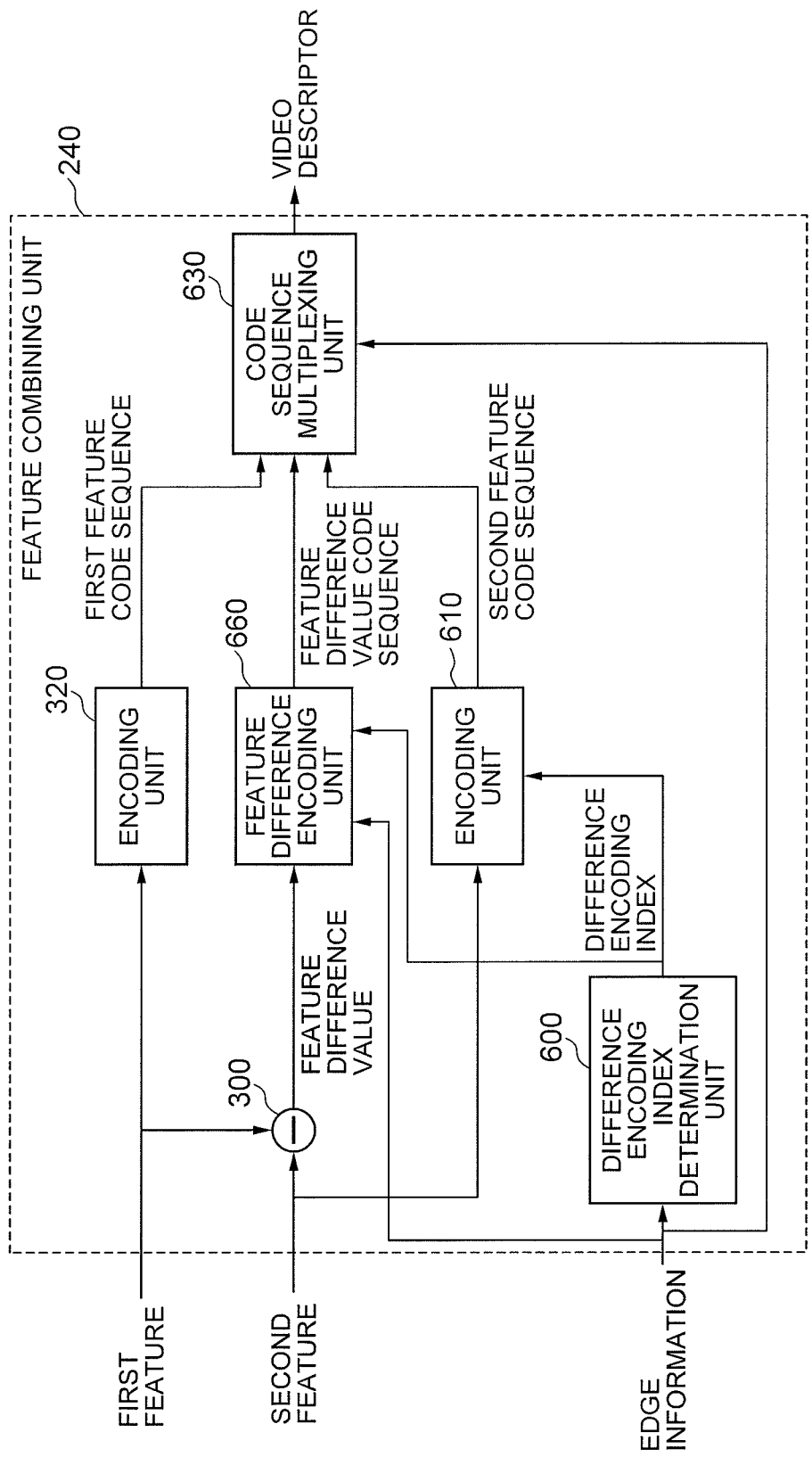
FIG. 9 is a block diagram showing the configuration of an embodiment of the feature combining unit 240 shown in FIG. 2.

Referring to FIG. 9 showing an embodiment of the feature combining unit 240, the feature combining unit 240 includes a feature subtraction unit 300, an encoding unit 320, a difference encoding index determination unit 600, an encoding unit 610, a feature difference encoding unit 660, and a code sequence multiplexing unit 630.

The configuration thereof is similar to that shown in FIG. 7 except that the feature difference encoding unit 660 is used instead of the feature difference encoding unit 640, and that the feature difference encoding unit 660 also receives edge information.

Next, operation of the feature combining unit 240 shown in FIG. 9 will be described.

Operation other than that of the feature difference encoding unit 660 is the same as the case shown in FIG. 7. Operation of the feature difference encoding unit 660 is also similar to that of the feature difference encoding unit 640 shown in FIG. 7 except that encoding is performed by changing an encoding parameter according to edge information. A method of performing encoding by changing an encoding parameter according to edge information is the same as the case of the feature difference encoding unit 440 shown in FIG. 5.

With the feature combining unit 240 shown in FIG. 9, as it is possible to improve the efficiency of feature difference encoding compared with the case shown in FIG. 7, encoding of features can be performed more effectively.

Next, another embodiment of the feature combining unit 240 will be described with reference to FIG. 10.

Figure 10:
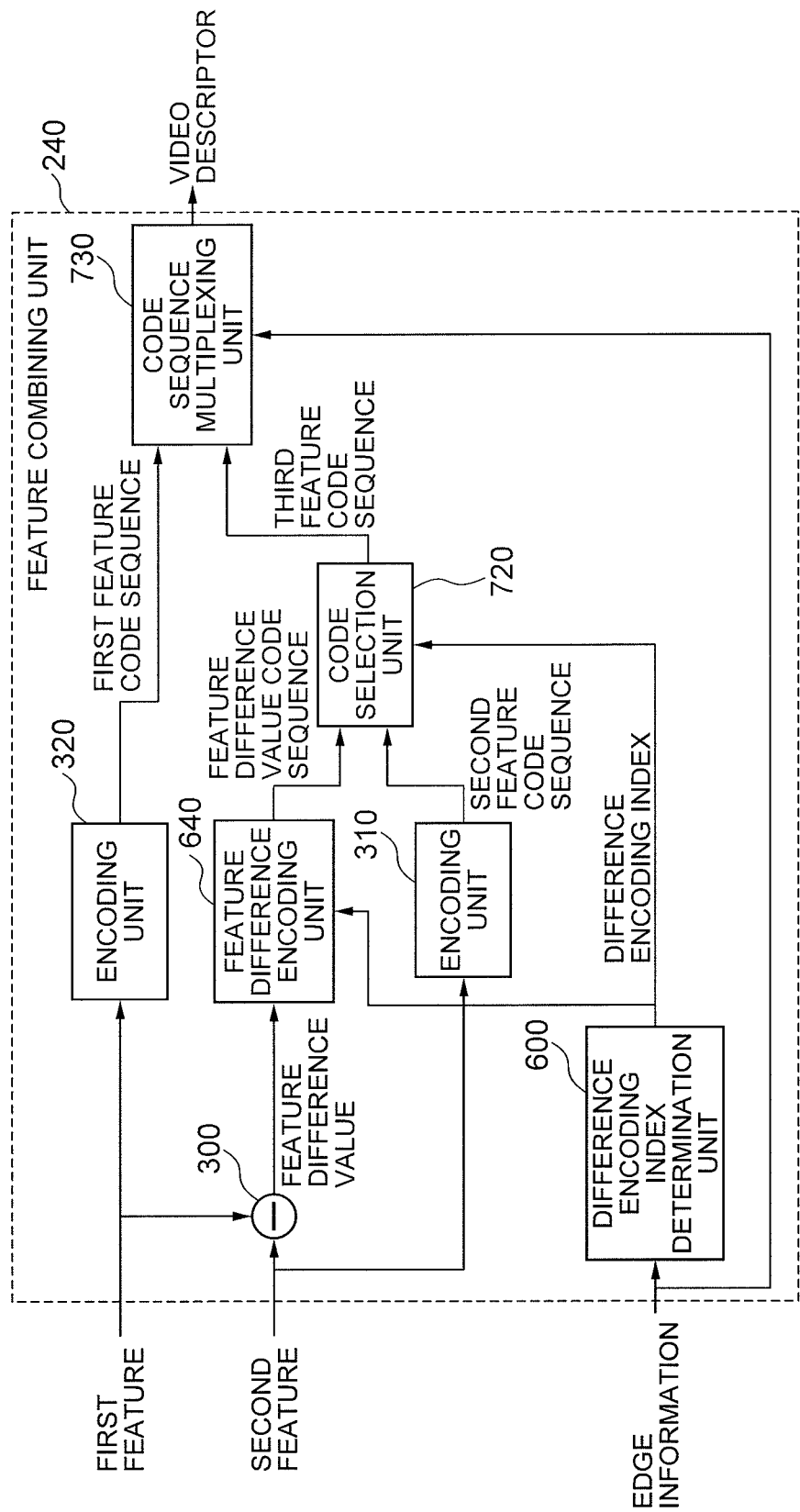
FIG. 10 is a block diagram showing the configuration of an embodiment of the feature combining unit 240 shown in FIG. 2.

Referring to FIG. 10 showing an embodiment of the feature combining unit 240, the feature combining unit 240 includes a feature subtraction unit 300, an encoding unit 320, a difference encoding index determination unit 600, an encoding unit 310, a feature difference encoding unit 640, a code selection unit 720, and a code sequence multiplexing unit 730.

The connection relation between the feature subtraction unit 300, the encoding unit 320, and the difference encoding index determination unit 600 is the same as that shown in FIG. 7. The feature difference encoding unit 640 applies difference-encoding to a feature difference value output from the feature subtraction unit 300 based on the difference encoding index output from the difference encoding index determination unit 600, and outputs a feature difference value code sequence to the code selection unit 720. The encoding unit 310 encodes a second feature and outputs a second feature code sequence to the code selection unit 720. The code selection unit 720 selects a code sequence based on the difference encoding index output from the difference encoding index determination unit 600, and outputs the selected code sequence as a third feature code sequence to the code sequence multiplexing unit 730. The code sequence multiplexing unit 730 generates a video descriptor from the first feature code sequence output from the encoding unit 320, the third feature code sequence output from the code selection unit 720, and the edge information, and outputs it.

Next, operation of the feature combining unit 240 shown in FIG. 10 will be described.

Operation of the feature subtraction unit 300, the encoding unit 320, the difference encoding index determination unit 600, and the feature difference encoding unit 640 is the same as the case shown in FIG. 7. Further, operation of the encoding unit 310 is the same as the case shown in FIG. 6.

The code selection unit 720 calculates, with respect to each of the feature difference value code sequence output from the feature difference encoding unit 640 and the second feature code sequence output from the encoding unit 310, the total sum of code quantities of the dimension corresponding to the difference encoding indexes output from the difference encoding index determination unit 600. For the dimension corresponding to the difference encoding index, a code sequence with which the total sum of the code quantities becomes small is selected. On the other hand, for a dimensions not corresponding to the difference encoding index, the codes of the second feature code sequence are selected. This is determined at predetermined intervals. As the interval, it is possible to use a picture or a segment configured of a plurality of pictures may be used. Then, the code selection unit 720 outputs the selected code sequence to the code sequence multiplexing unit 730 as a third feature code sequence. In this process, information indicating which of the ways is used for encoding is output as mode information to the code sequence multiplexing unit 730 for each picture or for each unit of pictures.

The code sequence multiplexing unit 730 multiplexes the first feature code sequence output from the encoding unit 320, the third feature code sequence output from the code selection unit 720, the edge information, and the mode information to thereby generate a video descriptor. The multiplexing method is almost similar to that of the case of the code sequence multiplexing unit 430 shown in FIG. 5, except that the mode information is also included in the video descriptor.

Even if encoding cannot be performed effectively in the feature difference encoding, as the features can be encoded directly with the feature combining unit 240 shown in FIG. 10, it is possible to perform feature encoding more effectively compared with the case of FIG. 7.

Next, another embodiment of the feature combining unit 240 will be described with reference to FIG. 11.

Figure 11:
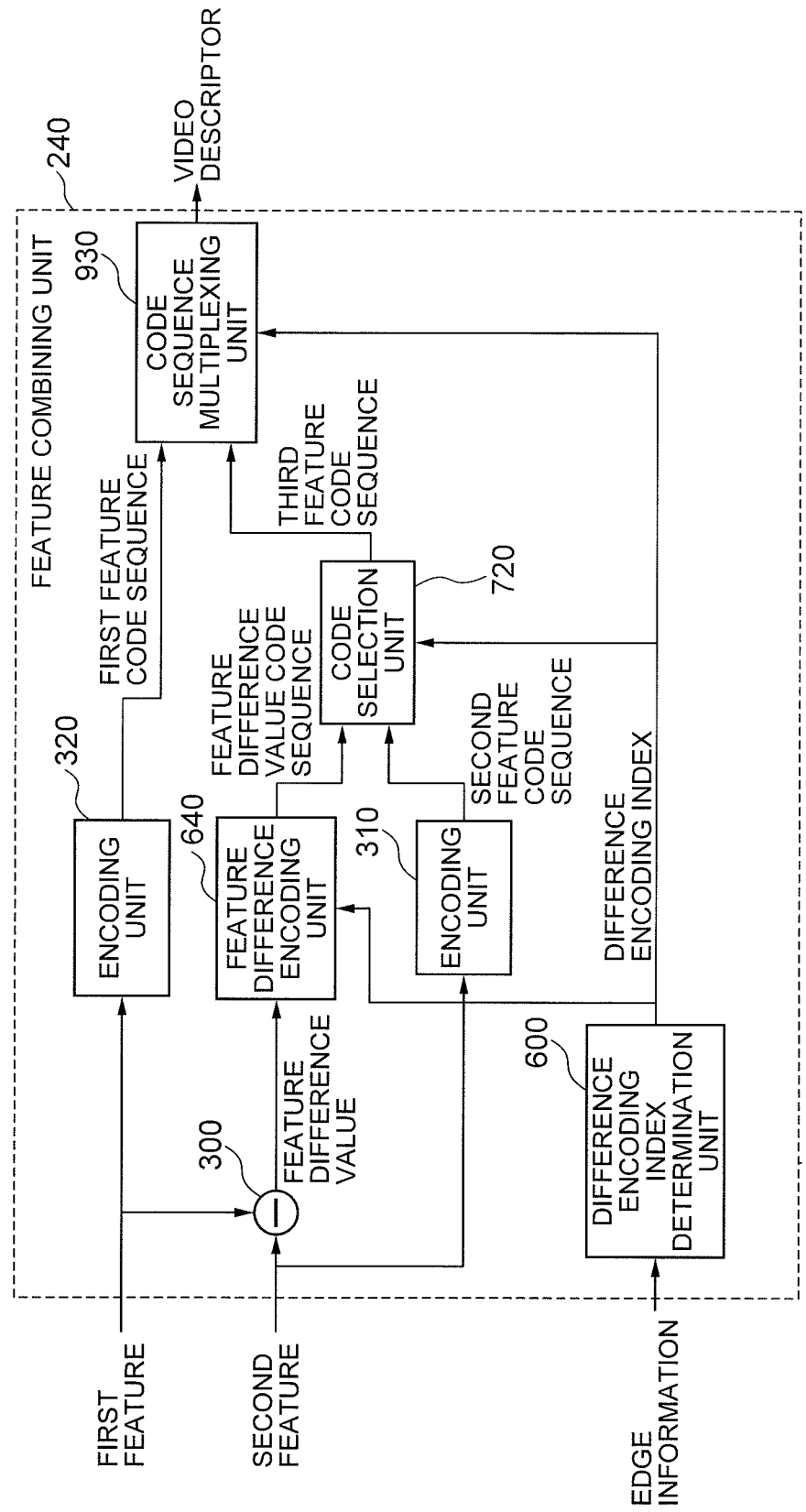
FIG. 11 is a block diagram showing the configuration of an embodiment of the feature combining unit 240 shown in FIG. 2.

Referring to FIG. 11 showing an embodiment of the feature combining unit 240, the feature combining unit 240 includes a feature subtraction unit 300, an encoding unit 320, a difference encoding index determination unit 600, an encoding unit 310, a feature difference encoding unit 640, a code selection unit 720, and a code sequence multiplexing unit 930.

The configuration thereof is similar to the case of FIG. 10, except that the code sequence multiplexing unit 930 is used instead of the code sequence multiplexing unit 730, and that a difference encoding index is input, instead of the difference encoding index, to the code sequence multiplexing unit 930.

Next, operation of the feature combining unit 240 shown in FIG. 11 will be described.

Operation other than that of the code sequence multiplexing unit 930 is the same as the case of FIG. 10. Operation of the code sequence multiplexing unit 930 is also similar to that of the code sequence multiplexing unit 730 shown in FIG. 10 except for an aspect of multiplexing difference encoding indexes instead of edge information.

The feature combining unit shown in FIG. 11 provides another embodiment having the same effect as that of FIG. 10.

Next, another embodiment of the feature combining unit 240 will be described with reference to FIG. 12.

Figure 12:
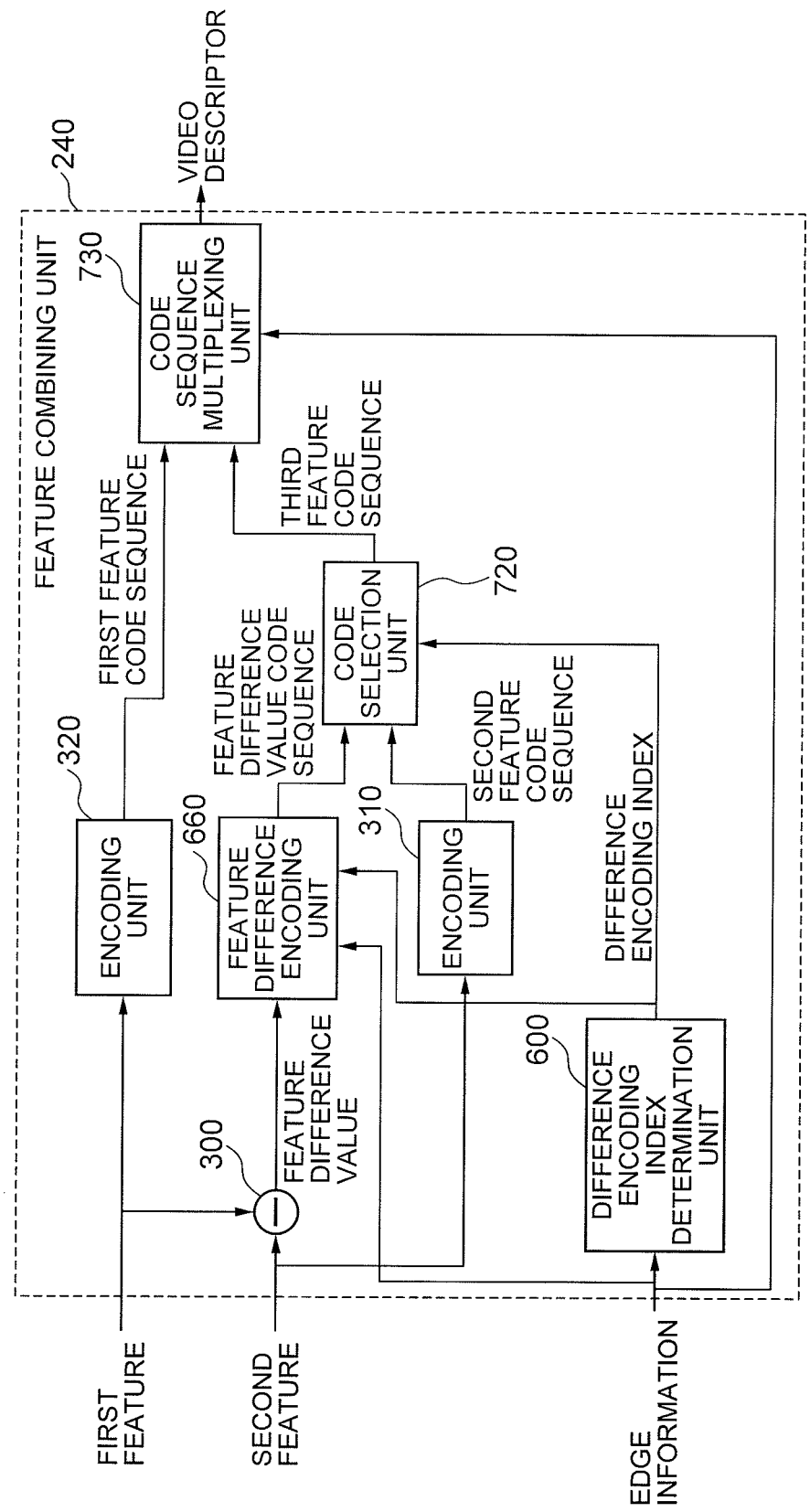
FIG. 12 is a block diagram showing the configuration of an embodiment of the feature combining unit 240 shown in FIG. 2.

Referring to FIG. 12 showing an embodiment of the feature combining unit 240, the feature combining unit 240 includes a feature subtraction unit 300, an encoding unit 320, a difference encoding index determination unit 600, an encoding unit 310, a feature difference encoding unit 660, a code selection unit 720, and a code sequence multiplexing unit 730.

The configuration thereof is similar to that of the case shown in FIG. 10 except that the feature difference encoding unit 660 is used instead of the feature difference encoding unit 640 and that edge information is also input to the feature difference encoding unit 660.

Next, operation of the feature combining unit 240 shown in FIG. 12 will be described.

Operation other than that of the feature difference encoding unit 660 is the same as the case shown in FIG. 10. Operation of the feature difference encoding unit 660 is also similar to the feature difference encoding unit 640 shown in FIG. 10 except for an aspect of performing encoding by changing an encoding parameter according to edge information. The method of performing encoding by changing an encoding parameter according to edge information is the same as the case of the feature difference encoding unit 440 shown in FIG. 5.

With the feature combining unit 240 shown in FIG. 12, it is possible to improve the efficiency of the feature difference encoding compared with the case of FIG. 10, whereby feature encoding can be performed more efficiently.

The second embodiment of the video descriptor generation device has been described above. With the second embodiment, it is possible to optimize the method of encoding features according to the size of black bars or an L-shaped region, whereby the encoding effectiveness of a video descriptor can be improved.

Next, an embodiment of a moving image matching device will be described in detail with reference to the drawings.

Figure 13:
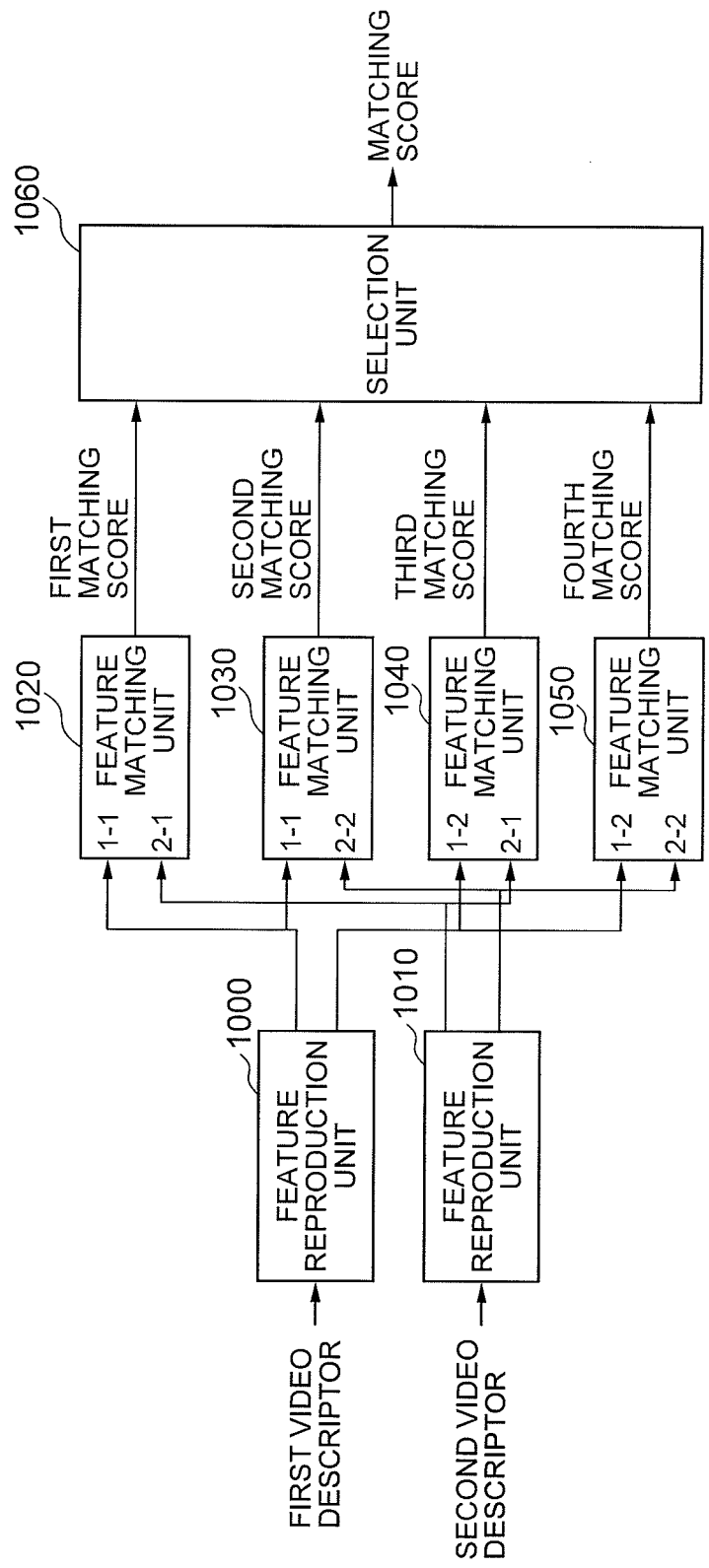
FIG. 13 is a block diagram showing the configuration of an embodiment of a moving image matching device according to the present invention.

Referring to FIG. 13 showing an embodiment of a moving image matching device of the present invention, the moving image matching device includes feature reproduction units 1000 and 1010, feature matching units 1020, 1030, 1040, and 1050, and a selection unit 1060.

The feature reproduction unit 1000 receives a first video descriptor, outputs a separated first feature of a first video to the feature matching units 1020 and 1030, and outputs a separated second feature of the first video to the feature matching units 1040 and 1050. The feature reproduction unit 1010 receives a second video descriptor, outputs a separated first feature of a second video to the feature matching units 1020 and 1040, and outputs a separated second feature of the second video to the feature matching units 1030 and 1050. The feature matching unit 1020 receives the first feature of the first video and the first feature of the second video, and outputs a first matching score to the selection unit 1060. The feature matching unit 1030 receives the first feature of the first video and the second feature of the second video, and outputs a second matching score to the selection unit 1060. The feature matching unit 1040 receives the second feature of the first video and the first feature of the second video, and outputs a third matching score to the selection unit 1060. The feature matching unit 1050 receives the second feature of the first video and the second feature of the second video, and outputs a fourth matching score to the selection unit 1060. The selection unit 1060 compares the first to fourth matching scores, selects one of them, and outputs it as a matching score.

Next, operation of the moving image matching device shown in FIG. 13 will be described.

First, a first video descriptor is input to the feature reproduction unit 1000. The feature reproduction unit 1000 reproduces the feature from the first video descriptor, extracts a first feature of a first video which is a feature of the case of not eliminating black bar regions and a second feature of the first video which is a feature of the case of eliminating the black bar regions, and outputs them. On the other hand, a second video descriptor is input to the feature reproduction unit 1010. The feature reproduction unit 1010 similarly extracts a first feature of the second video which is a feature of the case of not eliminating black bar regions and a second feature of the second video which is a feature of the case of eliminating the black bar regions, and outputs them. The details of feature reproduction performed by the feature reproduction units 1000 and 1010 will be described below.

To the feature matching unit 1020, the first feature of the first video and the first feature of the second video are input. In this step, matching is performed on the features of the first video and the second video of the case of not eliminating the black bar regions. In the matching, the values of the features are compared for each picture, and a scale representing a distance between the features or a similarity between the features is calculated. This process is performed on a plurality of continuous pictures to perform statistical processing, whereby a distance or a similarity (regarding the similarity, it is determined to be more similar as the value is larger) between the videos constituted of those pictures is calculated. The statistical processing includes calculating a total amount or an average of the values of each picture, calculating a maximum value, and calculating a median value. Further, it is also possible to determine outlier in the scores of a picture, and calculate the statistic such as an average or a median by eliminating it. Thereby, a matching result between the video segments is calculated. Hereinafter, this result is referred to as a matching score. The calculated matching score is output to the selection unit 1060.

Operation of the feature matching unit 1030, the feature matching unit 1040, and the feature matching unit 1050 is also similar to that of the feature matching unit 1020, basically. However, as the feature matching unit 1030 compares the first feature of the first video and the second feature of the second video, the feature matching unit 1030 calculates a matching score of the case of not eliminating the black bars in the first video and the case of eliminating the black bars in the second video. As the feature matching unit 1040 compares the second feature of the first video and the first feature of the second video, the feature matching unit 1040 calculates a matching score of the case of eliminating the black bars in the first video and the case of not eliminating the black bars in the second video. As the feature matching unit 1050 compares the second feature of the first video and the second feature of the second video, the feature matching unit 1050 calculates a matching score between the cases of eliminating the black bars in the first video and the second video. The matching scores are calculated while shifting the pictures in a time direction. It should be noted that the matching is performed on all combinations in which black bars are eliminated and not eliminated, in order to prevent deterioration in matching accuracy when black bars are erroneously detected in the black bar elimination processing. In this way, the matching scores calculated by the feature matching units 1030, 1040, 1050, and 1060 are output to the selection unit 1060.

The selection unit 1060 selects a score indicating the highest matching degree among the input matching scores. This means that if the matching score is defined by a distance, the selection unit 1060 selects a smallest value, while if the matching score is defined by a similarity, the selection unit 1060 selects a largest value.

With the moving image matching device shown in FIG. 13, it is possible to perform retrieval without deteriorating the retrieval accuracy even if black bar regions or an L-shaped region is included.

Next, an embodiment of the feature reproduction unit 1000 shown in FIG. 13 will be described with reference to FIG. 14.

Figure 14:
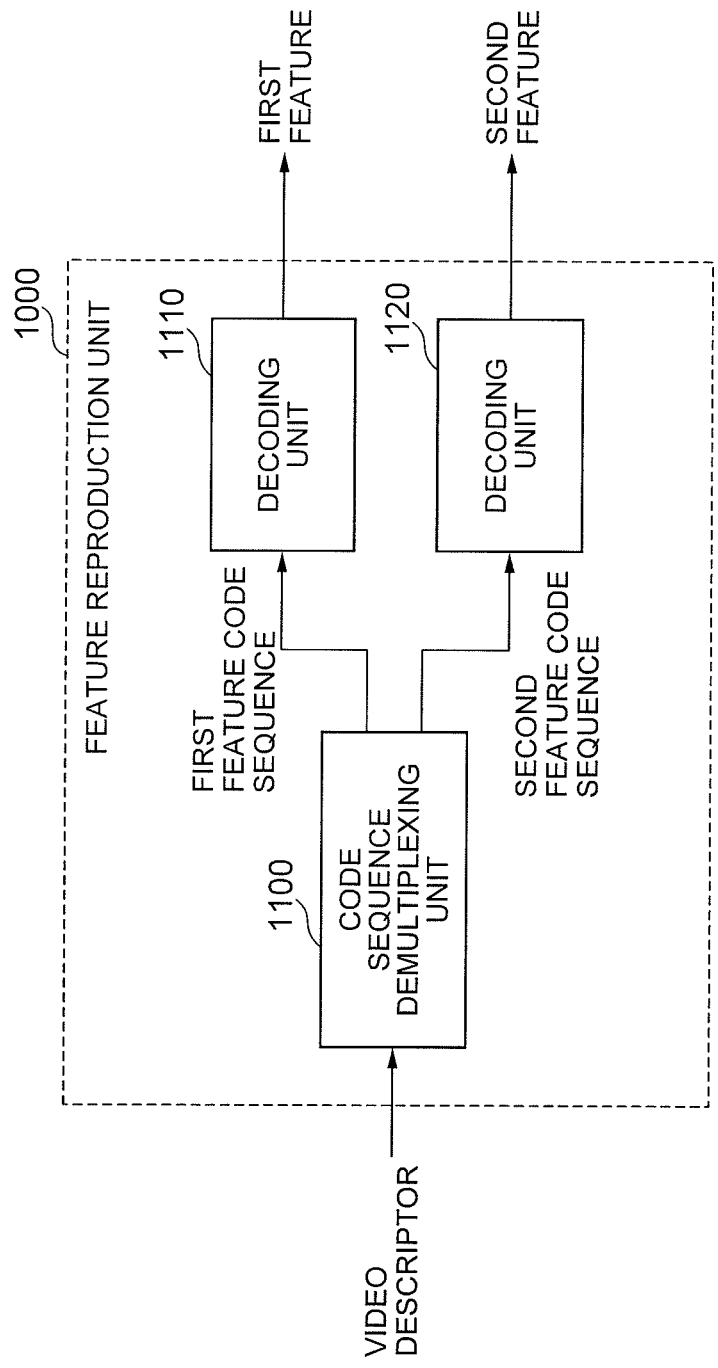
FIG. 14 is a block diagram showing the configuration of an embodiment of a feature reproduction unit 1000 shown in FIG. 13.

Referring to FIG. 14 showing an embodiment of the feature reproduction unit 1000 corresponding to the feature combining unit 140 shown in FIG. 3, the feature reproduction unit 1000 includes a code sequence demultiplexing unit 1100, a decoding unit 1110, and a decoding unit 1120.

The code sequence demultiplexing unit 1100 receives a video descriptor, outputs a separated first feature code sequence to the decoding unit 1110, and also outputs a second feature code sequence to the decoding unit 1120. The decoding unit 1110 decodes the first feature code sequence output from the code sequence demultiplexing unit 1100, generates a first feature, and outputs it. The decoding unit 1120 decodes the second feature code sequence output from the code sequence demultiplexing unit 1100, generates a second feature, and outputs it.

Next, operation of the feature reproduction unit 1000 shown in FIG. 14 will be described.

A video descriptor on which matching is performed is first input to the code sequence demultiplexing unit 1100. The code sequence demultiplexing unit 1100 separates the first feature code sequence and the second feature code sequence from the video descriptor by means of a demultiplexing method corresponding to the method used for multiplexing. For example, in the multiplexing, if the first feature code sequence and the second feature code sequence are simply integrated with a separable identification code between them, the code sequence demultiplexing unit 1100 identifies the identification code and separates them such that the part before the code is a first feature code sequence and the part after the code is a second feature code sequence. On the other hand, if the video descriptor is constructed by interleaving them in picture units, the code sequence demultiplexing unit 1100 separates them in picture units and reconstructs a code sequence. At that time, if they are constructed to be separable with an identification code between them, the code sequence demultiplexing unit 1100 separates them by identifying the identification code, while if the length of the code sequence for each of the pictures is included as header information, the code sequence demultiplexing unit 1100 separates them by delimiting them by the length. The first feature code sequence and the second feature code sequence separated in this manner are respectively output to the decoding unit 1110 and the decoding unit 1120.

The decoding unit 1110 decodes the first feature code sequence to generate a first feature. The decoding method depends on the method used for encoding. For example, if an input vector is an integer vector in N dimensions and a code sequence is generated in a format of simply aligning N pieces of integer values of the respective dimensions, it is only necessary to simply acquire the N-dimensional vector. In the case where an input vector is quantized and representative values (quantization indexes) are aligned, it is possible to perform inverse quantization after acquiring the representative values (or representative values obtained from the quantization indexes). In the case where entropy coding is performed, decoding corresponding thereto should be performed to obtain the symbol. For example, if Huffman coding is performed as entropy coding, it is possible to perform decoding using the Huffman table used for the encoding. If arithmetic encoding is performed, it is possible to perform arithmetic decoding using frequency distribution of the symbol used for the encoding. If entropy coding is performed after performing a process of removing correlation between dimensions, features can be calculated by first performing entropy decoding and then performing decoding corresponding to the processing performed for removing the correlation. If quantization and entropy coding are performed by performing frequency conversion, it is possible to calculate features by performing inverse quantization and inverse conversion of the frequency conversion after entropy decoding. If encoding is performed by calculating a difference from a feature of a past picture, it is possible to calculate a current feature of the picture by adding the value obtained by decoding to the feature of the past picture.

The decoding unit 1120 decodes the second feature code sequence and generates a second feature. Operation of the decoding unit 1120 is the same as that of the decoding unit 1110.

The feature reproduction unit 1000 shown in FIG. 14 provides a means for separating the features combined by the feature combining unit 140 shown in FIG. 3.

Next, another embodiment of the feature reproduction unit 1000 shown in FIG. 13 will be described with reference to FIG. 15.

Figure 15:
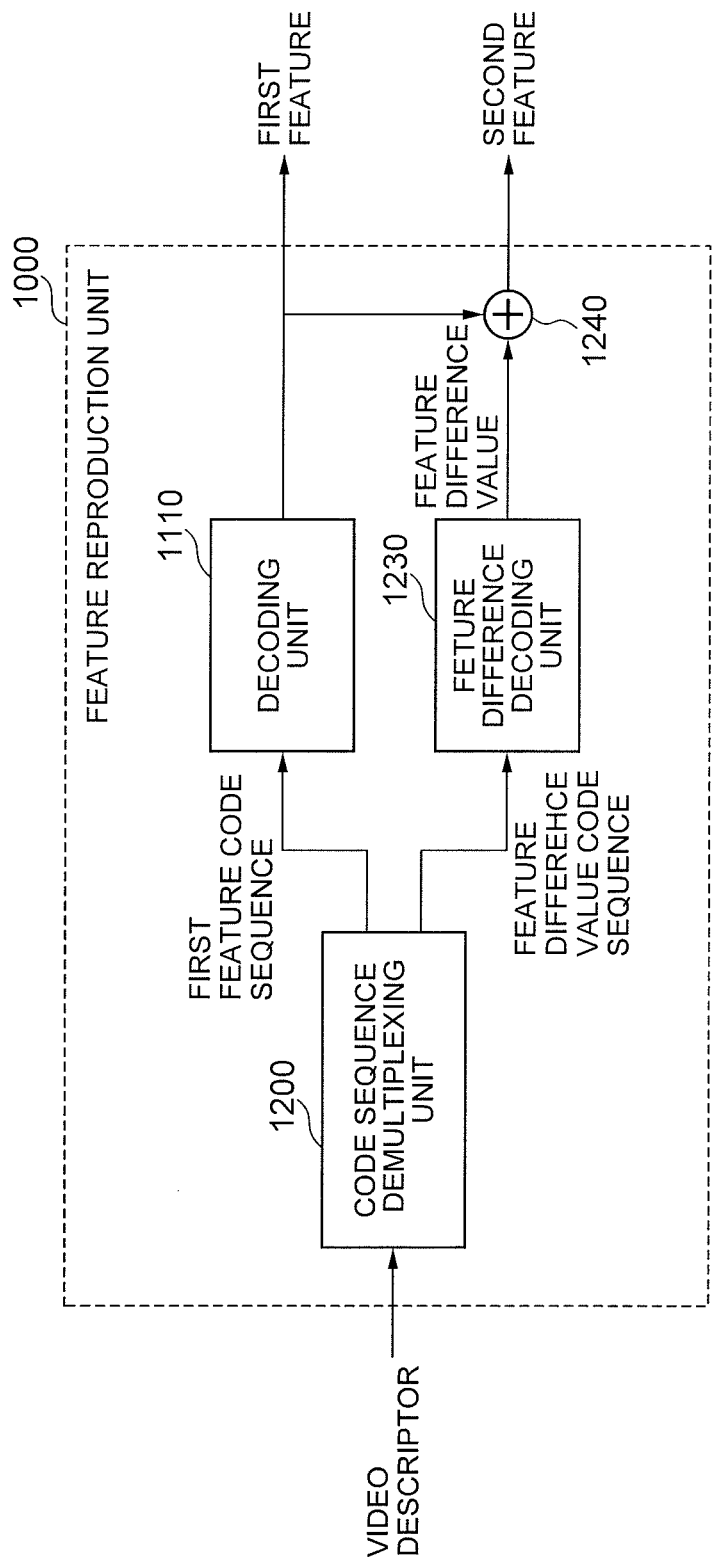
FIG. 15 is a block diagram showing the configuration of an embodiment of the feature reproduction unit 1000 shown in FIG. 13.

Referring to FIG. 15 showing an embodiment of the feature reproduction unit 1000 corresponding to the feature combining unit 140 shown in FIG. 4, the feature reproduction unit 1000 includes a code sequence demultiplexing unit 1200, a decoding unit 1110, a feature difference decoding unit 1230, and a feature addition unit 1240.

The code sequence demultiplexing unit 1200 receives a video descriptor, outputs a separated first feature code sequence to the decoding unit 1110, and outputs a feature difference value code sequence to the feature difference decoding unit 1230. The decoding unit 1110 decodes a first feature code sequence output from the code sequence demultiplexing unit 1200, and outputs a first feature. The feature difference decoding unit 1230 decodes the feature difference value code sequence output from the code sequence demultiplexing unit 1200, and outputs the obtained feature difference value to the feature addition unit 1240. The feature addition unit 1240 adds the first feature output from the decoding unit 1110 and the feature difference value output from the feature difference decoding unit 1230 to calculate a second feature, and outputs it.

Next, operation of the feature reproduction unit 1000 shown in FIG. 15 will be described.

A video descriptor on which matching is performed is first input to the code sequence demultiplexing unit 1200. The code sequence demultiplexing unit 1200 separates the first feature code sequence and the feature difference value code sequence from the video descriptor by means of a demultiplexing method corresponding to the method used for multiplexing. This operation is the same as that performed by the code sequence demultiplexing unit 1100 of the feature reproduction unit shown in FIG. 14. The separated first feature code sequence and the feature difference value code sequence are respectively output to the decoding unit 1110 and the feature difference decoding unit 1230.

Operation of the decoding unit 1110 is the same as the case shown in FIG. 14, and the decoding unit 1110 outputs a first feature. The first feature is also output to the feature addition unit 1240.

The feature difference decoding unit 1230 decodes the feature difference value code sequence to obtain a feature difference value. In this case, decoding is performed by performing inverse processing to the processing performed for encoding. For example, if encoding is performed by Huffman coding or arithmetic coding, decoding is performed by a corresponding decoding process. The obtained feature difference value is output to the feature addition unit 1240.

The feature addition unit 1240 adds the first feature output from the decoding unit 1110 and the feature difference value output from the feature difference decoding unit 1230 to reproduce the second feature, and outputs the obtained second feature.

The feature reproduction unit 1000 shown in FIG. 15 provides a means for separating the features combined by the feature combining unit 140 shown in FIG. 14.

Next, another embodiment of the feature reproduction unit 1000 shown in FIG. 13 will be described with reference to FIG. 16.

Figure 16:
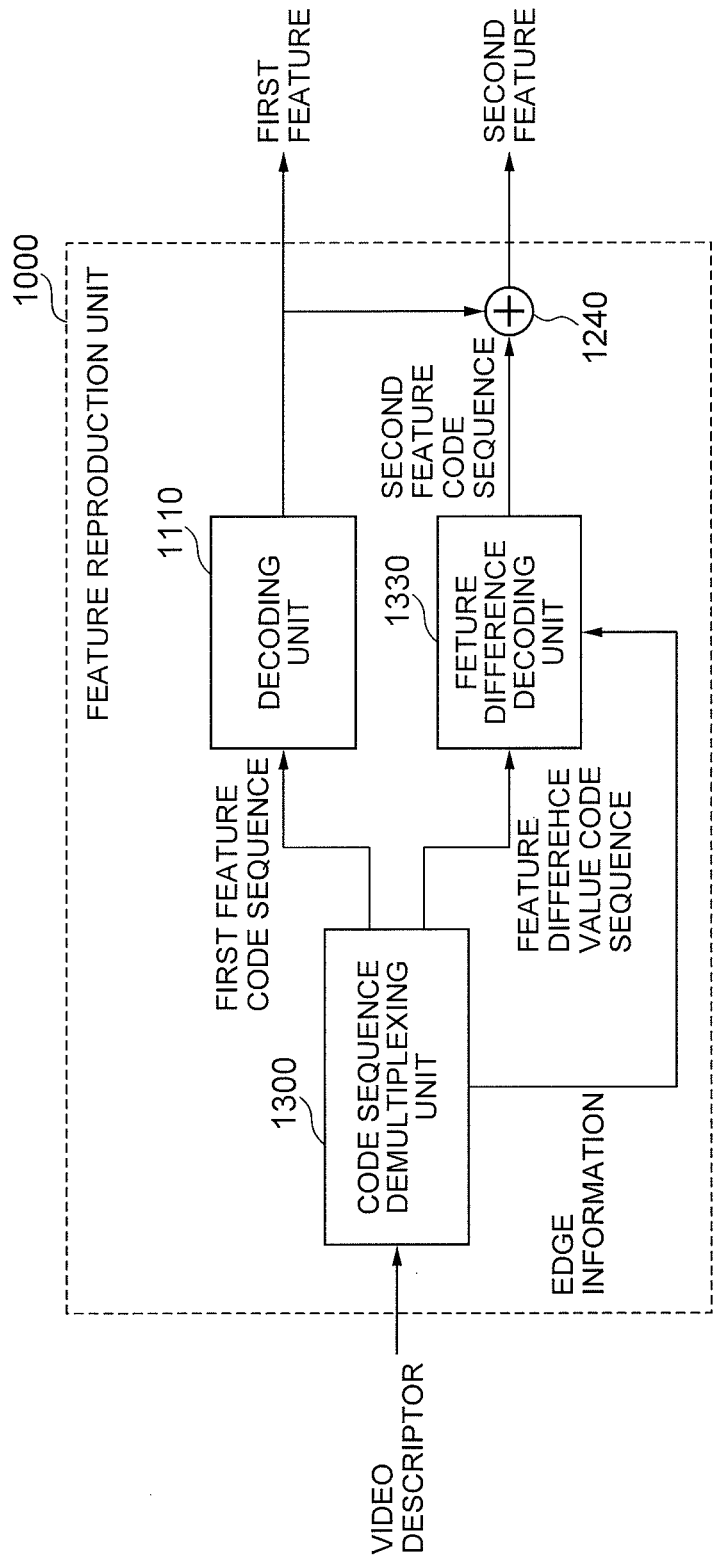
FIG. 16 is a block diagram showing the configuration of an embodiment of the feature reproduction unit 1000 shown in FIG. 13.

Referring to FIG. 16 showing an embodiment of the feature reproduction unit 1000 corresponding to the feature combining unit 240 shown in FIG. 5, the feature reproduction unit 1000 includes a code sequence demultiplexing unit 1300, a decoding unit 1110, a feature difference decoding unit 1330, and a feature addition unit 1240.

The code sequence demultiplexing unit 1300 receives a video descriptor, outputs a separated first feature code sequence to the decoding unit 1110, and also outputs a feature difference value code sequence and edge information to the feature difference decoding unit 1330. The connection relation between the decoding unit 1110 and the feature addition unit 1240 is the same as that shown in FIG. 15. The feature difference decoding unit 1330 decodes the feature difference value code sequence output from the code sequence demultiplexing unit 1300 based on the edge information output from the code sequence demultiplexing unit 1300, and outputs a feature difference value to the feature addition unit 1240.

The decoding unit 1110 decodes the first feature code sequence output from the code sequence demultiplexing unit 1300, and outputs a first feature. The feature addition unit 1240 adds the first feature output from the decoding unit 1110 and the feature difference value output from the feature difference decoding unit 1330 to calculate a second feature, and outputs it.

Next, operation of the feature reproduction unit 1000 shown in FIG. 16 will be described.

A video descriptor on which matching is performed is first input to the code sequence demultiplexing unit 1300. While operation of the code sequence demultiplexing unit 1300 is similar to that of the code sequence demultiplexing unit 1200 shown in FIG. 15, it also outputs edge information. The edge information is output to the feature difference decoding unit 1330.

While operation of the feature difference decoding unit 1330 is basically similar to that of the feature difference decoding unit 1230 shown in FIG. 15, it differs in that a coding parameter is specified using the input edge information and decoding is performed using the parameter.

The operation other than such a difference is the same as that of the feature reproduction unit 1000 shown in FIG. 15.

The feature reproduction unit 1000 shown in FIG. 16 provides a means for separating the features combined by the feature combining unit 240 shown in FIG. 5.

Next, another embodiment of the feature reproduction unit 1000 shown in FIG. 13 will be described with reference to FIG. 17.

Figure 17:
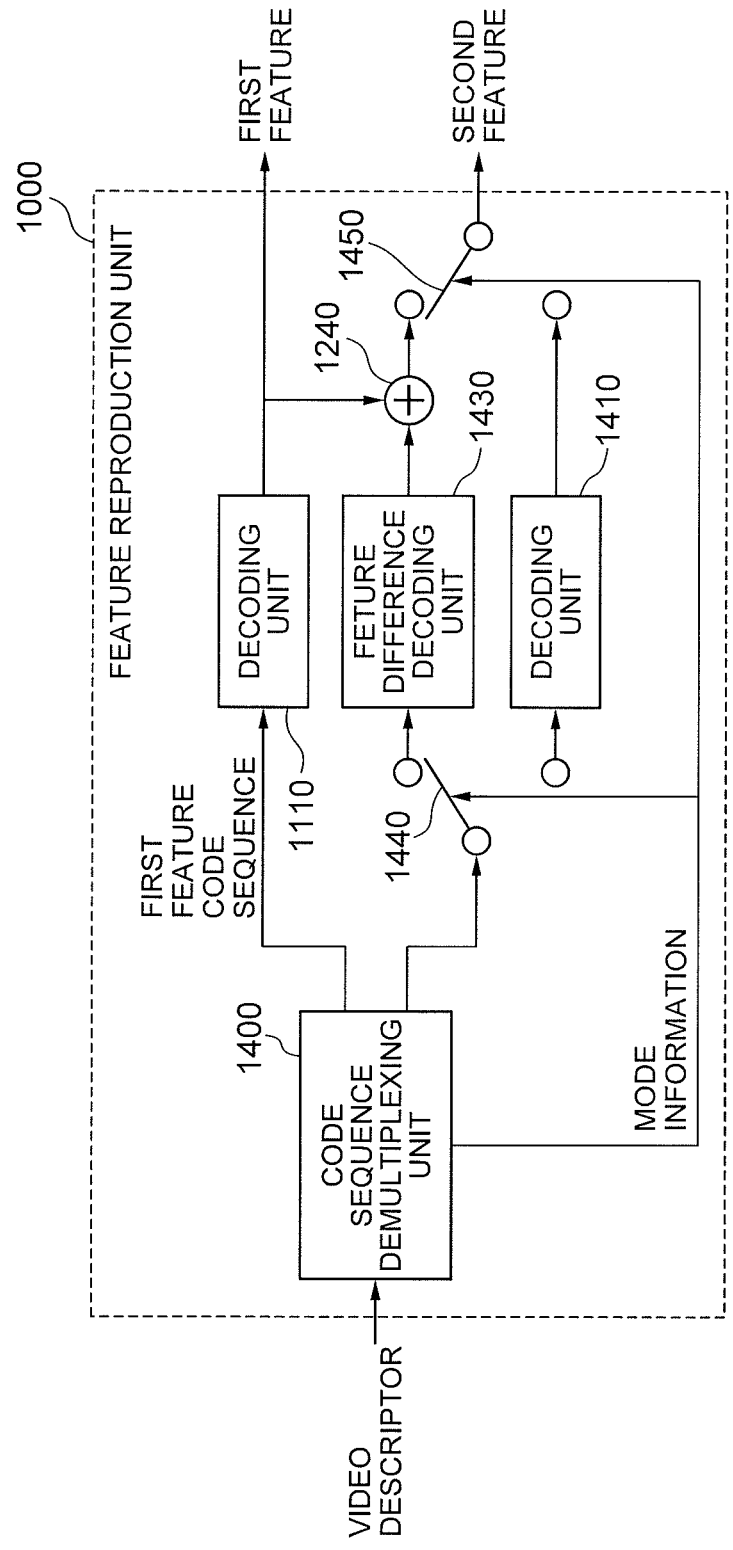
FIG. 17 is a block diagram showing the configuration of an embodiment of the feature reproduction unit 1000 shown in FIG. 13.

Referring to FIG. 17 showing an embodiment of the feature reproduction unit 1000 corresponding to the feature combining unit 140 shown in FIG. 6, the feature reproduction unit 1000 includes a code sequence demultiplexing unit 1400, a decoding unit 1110, a decoding unit 1410, a feature difference decoding unit 1430, a feature addition unit 1240, a switching unit 1440, and a switching unit 1450.

The code sequence demultiplexing unit 1400 receives a video descriptor, outputs a separated first feature code sequence to the decoding unit 1110, and outputs a third feature code sequence to the switching unit 1440. Further, the code sequence demultiplexing unit 1400 also outputs mode information for controlling switching units to the switching unit 1440 and the switching unit 1450. The decoding unit 1110 receives the first feature code sequence output from the code sequence demultiplexing unit 1400, and outputs a first feature. The switching unit 1440 outputs the third feature code sequence output from the code sequence demultiplexing unit 1400 to either the feature difference decoding unit 1430 or the decoding unit 1410 according to the mode information input from the code sequence demultiplexing unit 1400. The feature difference decoding unit 1430 receives the third feature code sequence output from the switching unit 1440, and outputs a feature difference value to the feature addition unit 1240. The decoding unit 1410 receives the third feature code sequence output from the switching unit 1440, and outputs a decoding result to the switching unit 1450. The feature addition unit 1240 receives the first feature output from the decoding unit 1110 and the feature difference value output from the feature difference decoding unit 1430, and outputs the addition result to the switching unit 1450. The switching unit 1450 receives the addition result output from the feature addition unit 1240 and the decoding result output from the decoding unit 1410, reconstructs the second feature based on the mode information output from the code sequence demultiplexing unit 1400, and outputs it.

Next, operation of the feature reproduction unit 1000 shown in FIG. 17 will be described.

A video descriptor on which matching is performed is first input to the code sequence demultiplexing unit 1400. The code sequence demultiplexing unit 1400 separates the first feature code sequence and the third feature code sequence from the video descriptor by means of a demultiplexing method corresponding to the method used for multiplexing. This operation is the same as that performed by the code sequence demultiplexing unit 1100 of the feature reproduction unit shown in FIG. 14. The separated first feature code sequence and the third feature code sequence are respectively output to the decoding unit 1110 and the switching unit 1440. The mode information is also demultiplexed from the video descriptor, and output to the switching unit 1440 and the switching unit 1450.

Operation of the decoding unit 1110 is the same as the case shown in FIG. 14, and the decoding unit 1110 outputs a first feature. The first feature is also output to the feature addition unit 1240.

The switching unit 1440 changes the output destination of the third feature code sequence according to the mode information output from the code sequence demultiplexing unit 1400. If the mode information indicates that the feature included in the third feature code sequence is a feature difference value, the switching unit 1440 outputs the third feature code sequence to the feature difference decoding unit 1430. On the other hand, if the mode information indicates that the feature included in the third feature code sequence is a second feature, the switching unit 1440 outputs the third feature code sequence to the decoding unit 1410. The timing of switching the output destination according to the mode information depends on how the third feature code sequence is created at the time of encoding. If the entire video is encoded in one mode, it is possible to set the output destination once at the beginning according to the mode information.

If the video is encoded such that the mode is switched in picture units, it is possible to perform switching in picture units. If the video is encoded such that the mode is switched for each unit of a plurality of pictures or switched in region units within the picture, it is possible to perform switching according to the units.

The feature difference decoding unit 1430 decodes the third feature code sequence output from the switching unit 1440 to thereby reproduce (a part of) the feature difference value. Operation of the feature difference decoding unit 1430 is basically similar to that of the feature difference decoding unit 1230 shown in FIG. 15. However, if a part of the feature difference value code sequence (e.g., only part of the pictures) is to be decoded by the feature difference decoding unit 1430 depending on the mode, information specifying that features corresponding to which pictures or which regions are to be decoded is also included in the third feature code sequence. As such, the feature difference decoding unit 1430 performs decoding while referring to such information. The obtained feature difference value is output to the feature addition unit 1240.

Operation of the feature addition unit 1240 is the same as the case shown in FIG. 15, and an addition result which is a (part of) second feature is output to the switching unit 1450.

The decoding unit 1410 decodes the third feature code sequence output from the switching unit 1440 to thereby reproduce (a part of) the second feature. Operation of the decoding unit 1410 is basically similar to that of the decoding unit 1120 shown in FIG. 14. However, if a part of the third feature code sequence (e.g., only part of the pictures) is to be decoded by the decoding unit 1410 depending on the mode, information specifying that features corresponding to which pictures or which regions are to be decoded is also included in the third feature code sequence. As such, the decoding unit 1410 performs decoding while referring to this information. The decoding result is output to the switching unit 1450.

The switching unit 1450 switches the output source of the second feature according to the mode information output from the code sequence demultiplexing unit 1400. If the mode information indicates that the feature included in the third feature code sequence is a feature difference value, the switching unit 1450 outputs the addition result output from the feature addition unit 1240 as a second feature. On the other hand, if the mode information indicates that the feature included in the third feature code sequence is a second feature, the switching unit 1450 outputs the decoding result output from the decoding unit 1410 as a second feature.

The feature reproduction unit shown in FIG. 17 provides a means for separating the features combined by the feature combining unit 140 shown in FIG. 6.

Next, another embodiment of the feature reproduction unit 1000 shown in FIG. 13 will be described with reference to FIG. 18.

Figure 18:
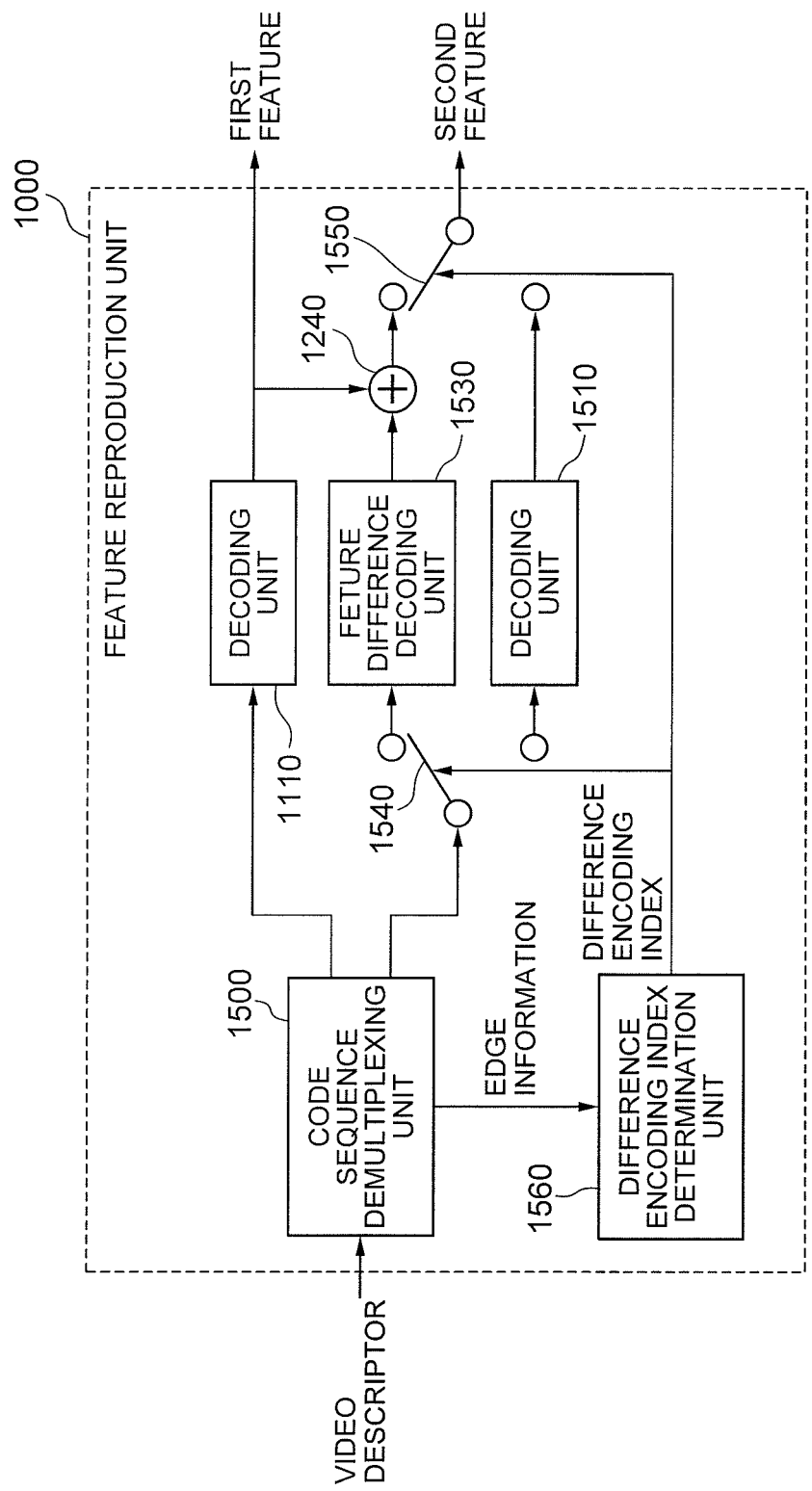
FIG. 18 is a block diagram showing the configuration of an embodiment of the feature reproduction unit 1000 shown in FIG. 13.

Referring to FIG. 18 showing an embodiment of the feature reproduction unit 1000 corresponding to the feature combining unit 240 shown in FIG. 7, the feature reproduction unit 1000 includes a code sequence demultiplexing unit 1500, a decoding unit 1110, a decoding unit 1510, a feature difference decoding unit 1530, a feature addition unit 1240, a switching unit 1540, a switching unit 1550, and a difference encoding index determination unit 1560.

The code sequence demultiplexing unit 1500 receives a video descriptor, outputs a separated first feature code sequence to the decoding unit 1110, and outputs a third feature code sequence to the switching unit 1540. The code sequence demultiplexing unit 1500 also outputs edge information to the difference encoding index determination unit 1560. The difference encoding index determination unit 1560 receives the edge information output from the code sequence demultiplexing unit 1500, and outputs difference encoding indexes to the switching unit 1540 and the switching unit 1550. The decoding unit 1110 receives the first feature code sequence output from the code sequence demultiplexing unit 1500, and outputs a first feature. The switching unit 1540 outputs the third feature code sequence output from the code sequence demultiplexing unit 1500 to either the feature difference decoding unit 1530 or the decoding unit 1510, according to the difference encoding indexes input from the difference encoding index determination unit 1560. The decoding unit 1510 receives the third feature code sequence output from the switching unit 1540, and outputs the decoding result to the switching unit 1550. The feature difference decoding unit 1530 receives the third feature code sequence output from the switching unit 1540, and outputs a feature difference value to the feature addition unit 1240. The feature addition unit 1240 adds the first feature output from the decoding unit 1110 and the feature difference value output from the feature difference decoding unit 1530, and outputs the addition result to the switching unit 1550. The switching unit 1550 receives the addition result output from the feature addition unit 1240 and the decoding result output from the decoding unit 1510, reconstructs a second feature based on the difference encoding indexes output from the difference encoding index determination unit 1560, and outputs it.

Next, operation of the feature reproduction unit 1000 shown in FIG. 18 will be described.

A video descriptor on which matching is performed is first input to the code sequence demultiplexing unit 1500. The code sequence demultiplexing unit 1500 separates the first feature code sequence and the third feature code sequence from the video descriptor by means of a demultiplexing method corresponding to the method used for multiplexing. This operation is the same as that performed by the code sequence demultiplexing unit 1100 of the feature reproduction unit shown in FIG. 14. The separated first feature code sequence and the third feature code sequence are respectively output to the decoding unit 1110 and the switching unit 1540. The edge information, which is information describing the edge in the screen formed by black regions or an L-shaped region, is also demultiplexed from the video descriptor, and output to the difference encoding index determination unit 1560.

The difference encoding index determination unit 1560 is the same as that used for encoding. The difference encoding index determination unit 1560 determines dimensions, among the respective dimensions of the feature, on which difference encoding is performed, and outputs indexes representing the dimension as difference encoding indexes.

Operation of the decoding unit 1110 is the same as the case of FIG. 14, and the decoding unit 1110 outputs a first feature. The first feature is also output to the feature addition unit 1240.

The switching unit 1540 changes the output destination of the third feature code sequence for each dimension of the feature, according to the difference encoding indexes output from the difference encoding index determination unit 1560. With respect to the dimensions designated by the difference encoding indexes, the switching unit 1540 outputs the third feature code sequence to the feature difference decoding unit 1530. On the other hand, with respect to the dimensions not designated by the difference encoding indexes, the switching unit 1540 outputs the third feature code sequence to the decoding unit 1510.

The feature difference decoding unit 1530 decodes the third feature code sequence output from the switching unit 1540, and reproduces the value, among the feature difference values, of the dimension designated by the difference encoding indexes. Operation of the feature difference decoding unit 1530 is basically similar to that of the feature difference decoding unit 1230 shown in FIG. 15. The obtained feature difference value is output to the feature addition unit 1240.

Operation of the feature addition unit 1240 is the same as the case shown in FIG. 15, and the addition result which is (a part of) the second feature is output to the switching unit 1550.

The decoding unit 1510 decodes the third feature code sequence output from the switching unit 1540, and reproduces the value of the dimensions not designated by the difference encoding indexes, of the second feature. Operation of the decoding unit 1510 is basically similar to that of the decoding unit 1120 shown in FIG. 14. The decoding result is output to the switching unit 1550.

The switching unit 1550 switches the output destination of the second feature according to the difference encoding indexes output from the difference encoding index determination unit 1560. With respect to the dimensions included in the difference encoding indexes, the switching unit 1550 outputs the addition result output from the feature addition unit 1240 as a second feature. On the other hand, with respect to the dimensions not included in the difference encoding indexes, the switching unit 1550 outputs the decoding result output from the decoding unit 1510 as a second feature.

The feature reproduction unit 1000 shown in FIG. 18 provides a means for separating the features combined by the feature combining unit 240 shown in FIG. 7.

Next, another embodiment of the feature reproduction unit 1000 shown in FIG. 13 will be described with reference to FIG. 19.

Figure 19:
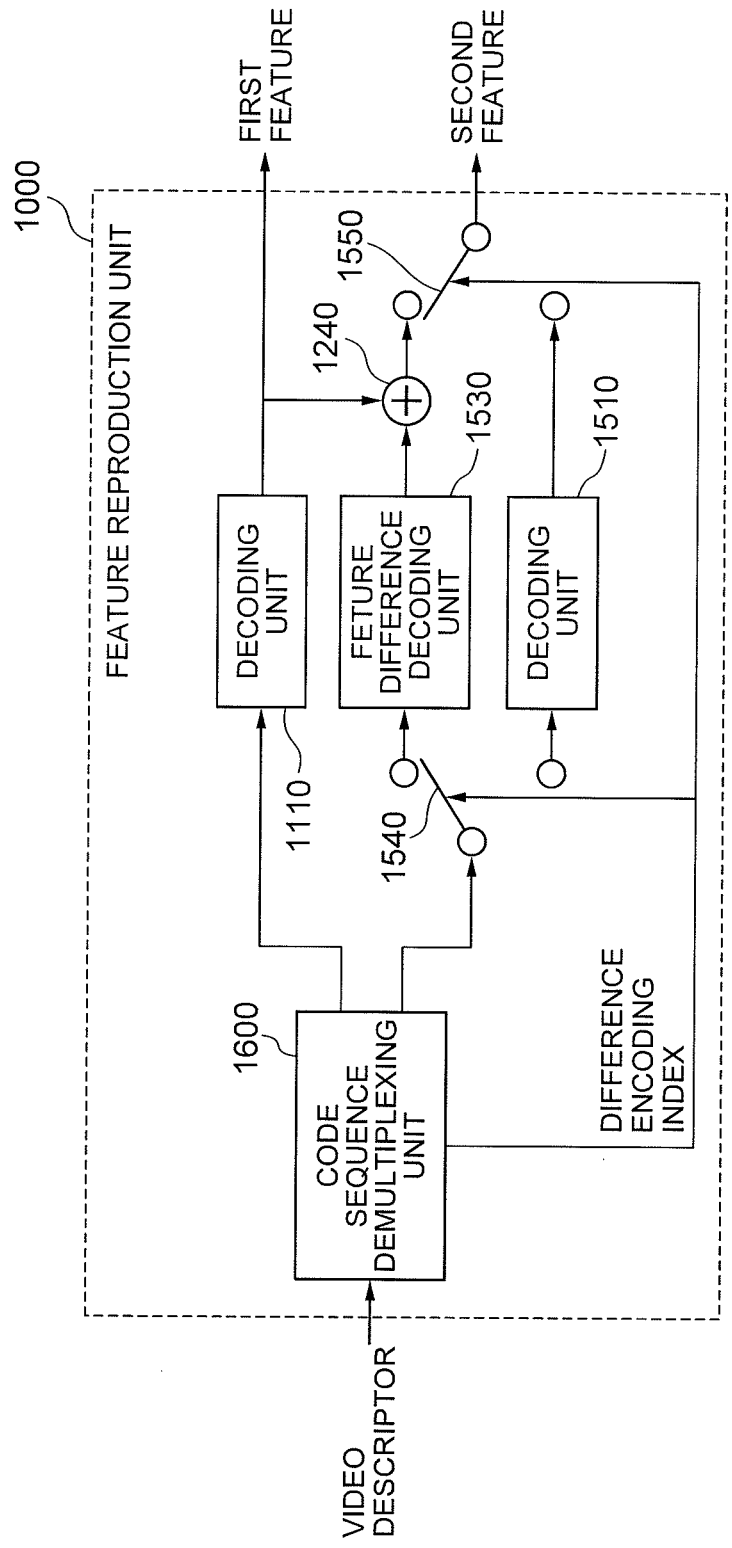
FIG. 19 is a block diagram showing the configuration of an embodiment of the feature reproduction unit 1000 shown in FIG. 13.

Referring to FIG. 19 showing an embodiment of the feature reproduction unit 1000 corresponding to the feature combining unit 240 shown in FIG. 8, the feature reproduction unit 1000 includes a code sequence demultiplexing unit 1600, a decoding unit 1110, a decoding unit 1510, a feature difference decoding unit 1530, a feature addition unit 1240, a switching unit 1540, and a switching unit 1550.

The configuration thereof is similar to that shown in FIG. 18 except for the code sequence demultiplexing unit 1600, the switching unit 1540, and the switching unit 1550. The code sequence demultiplexing unit 1600 receives a video descriptor, outputs a separated first feature code sequence to the decoding unit 1110, and also outputs a third feature code sequence to the switching unit 1540. Further, the code sequence demultiplexing unit 1600 outputs difference encoding indexes to the switching unit 1540 and the switching unit 1550. The switching unit 1540 outputs the third feature code sequence output from the code sequence demultiplexing unit 1500 to either the feature difference decoding unit 1530 or the decoding unit 1510, according to the difference encoding indexes output from the code sequence demultiplexing unit 1600. The switching unit 1550 receives the addition result output from the feature addition unit 1240 and the decoding result output from the decoding unit 1510, reconstructs the second feature based on the difference encoding indexes output from the code sequence demultiplexing unit 1600, and outputs it.

Next, operation of the feature reproduction unit 1000 shown in FIG. 19 will be described.

Operation other than that of the code sequence demultiplexing unit 1600 is the same as the case of FIG. 18. Operation of the code sequence demultiplexing unit 1600 is also similar to that of the code sequence demultiplexing unit 1500 shown in FIG. 18 except for an aspect of demultiplexing a difference encoding indexes instead of edge information.

The feature reproduction unit 1000 shown in FIG. 19 provides a means for separating the features combined by the feature combining unit 240 shown in FIG. 8.

Next, another embodiment of the feature reproduction unit 1000 shown in FIG. 13 will be described with reference to FIG. 20.

Figure 20:
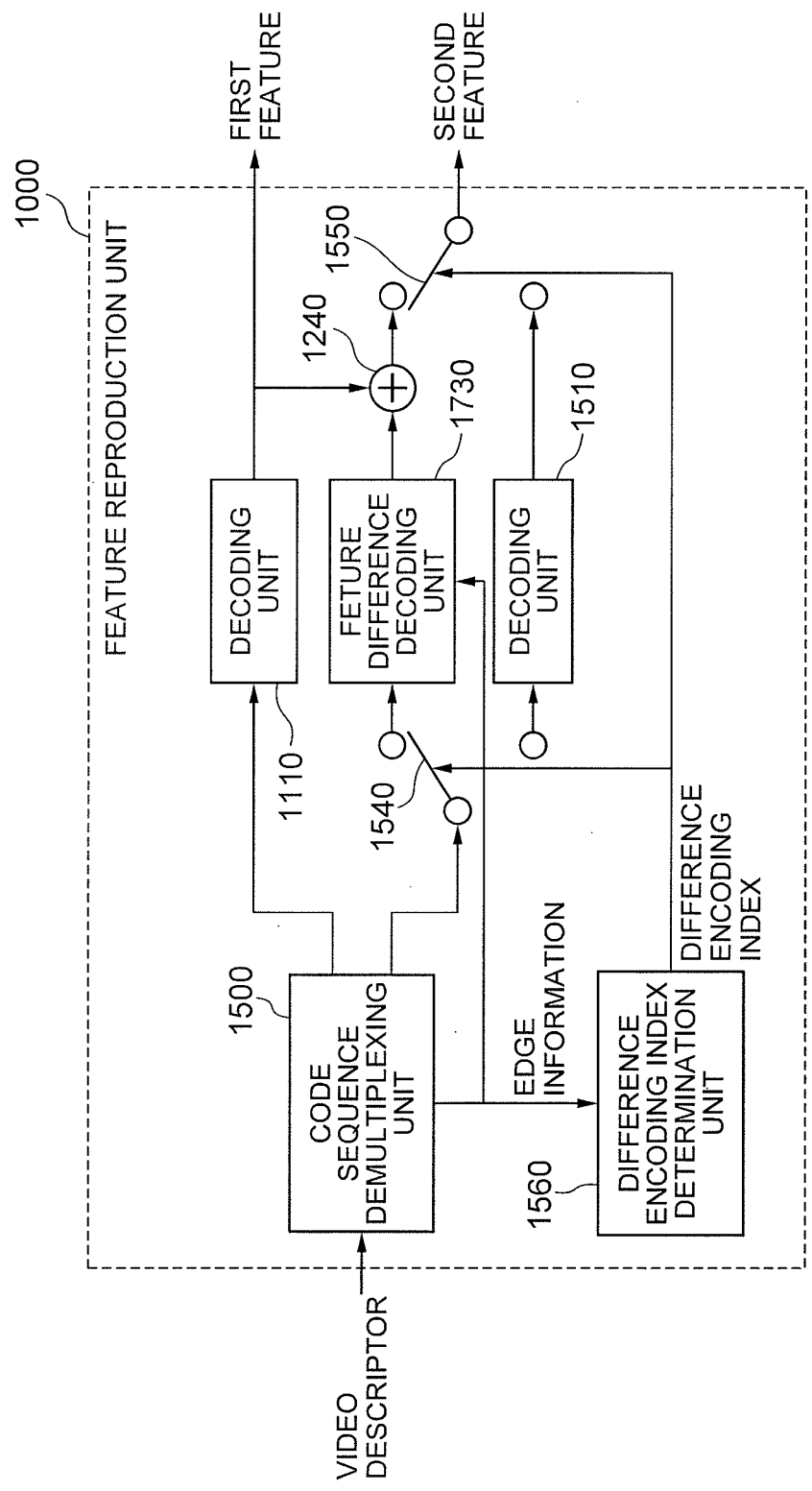
FIG. 20 is a block diagram showing the configuration of an embodiment of the feature reproduction unit 1000 shown in FIG. 13.

Referring to FIG. 20 showing an embodiment of the feature reproduction unit 1000 corresponding to the feature combining unit 240 shown in FIG. 9, the feature reproduction unit 1000 includes a code sequence demultiplexing unit 1500, a decoding unit 1110, a decoding unit 1510, a feature difference decoding unit 1730, a feature addition unit 1240, a switching unit 1540, and a switching unit 1550.

The connection relation between the units other than the code sequence demultiplexing unit 1500 and the feature difference decoding unit 1730 is the same as that shown in FIG. 18. The code sequence demultiplexing unit 1500 receives a video descriptor, outputs a separated first feature code sequence to the decoding unit 1110, and outputs a third feature code sequence to the switching unit 1540. Further, the code sequence demultiplexing unit 1500 outputs edge information to the difference encoding index determination unit 1560 and the feature difference decoding unit 1730. The feature difference decoding unit 1730 receives the third feature code sequence output from the switching unit 1540 and the edge information output from the code sequence demultiplexing unit 1500, and outputs a feature difference value to the feature addition unit 1240.

Next, operation of the feature reproduction unit 1000 shown in FIG. 20 will be described.

Operation other than that of the feature difference decoding unit 1730 is the same as the case shown in FIG. 18. Operation of the feature difference decoding unit 1730 is also similar to that of the feature difference decoding unit 1530 shown in FIG. 18, except for an aspect of performing decoding by changing the coding parameter according to the edge information.

The feature reproduction unit 1000 shown in FIG. 20 provides a means for separating the features combined by the feature combining unit 240 shown in FIG. 9.

Next, another embodiment of the feature reproduction unit 1000 shown in FIG. 13 will be described with reference to FIG. 21.

Figure 21:
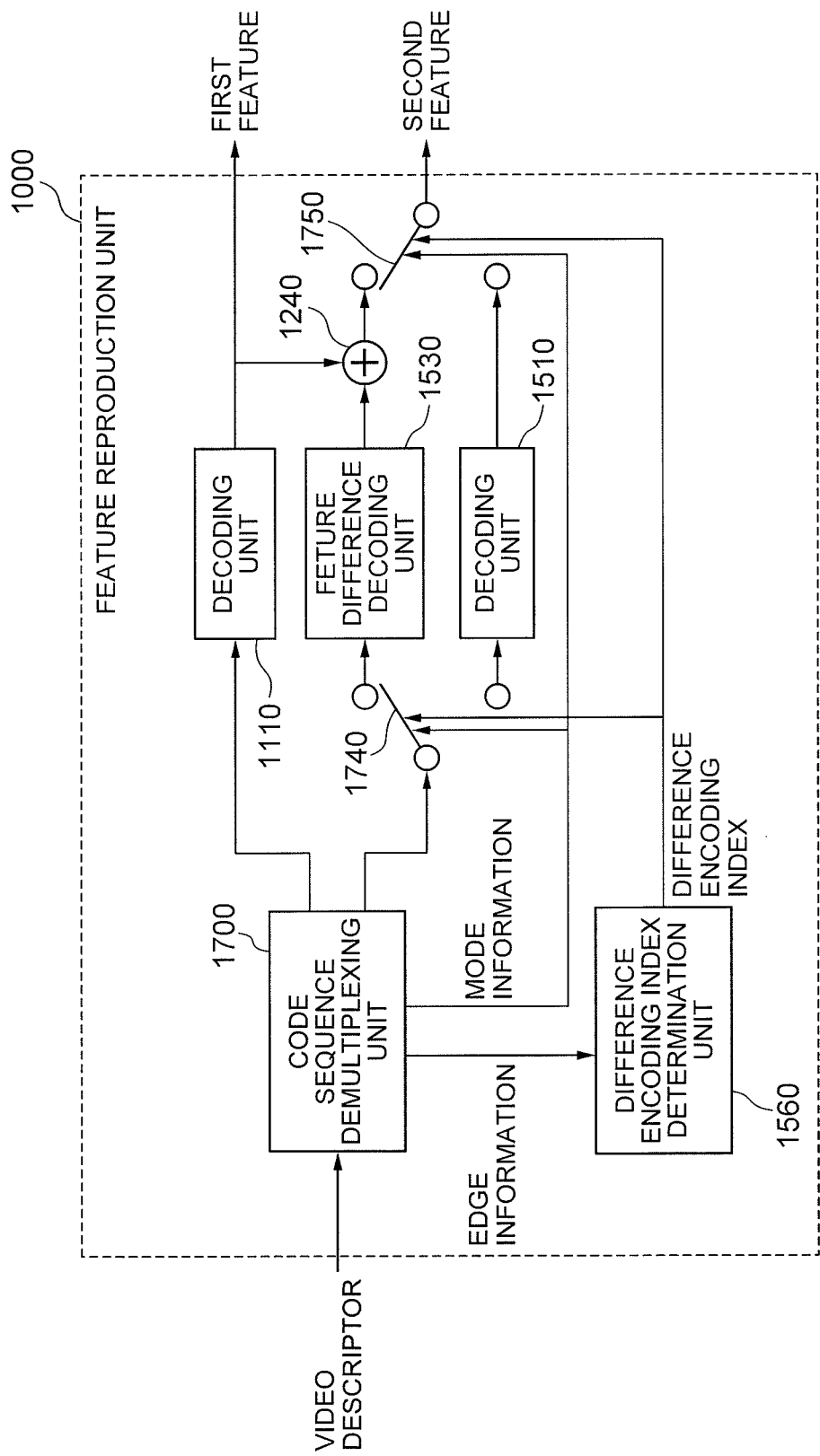
FIG. 21 is a block diagram showing the configuration of an embodiment of the feature reproduction unit 1000 shown in FIG. 13.

Referring to FIG. 21 showing an embodiment of the feature reproduction unit 1000 corresponding to the feature combining unit 240 shown in FIG. 10, the feature reproduction unit 1000 includes a code sequence demultiplexing unit 1700, a decoding unit 1110, a decoding unit 1510, a feature difference decoding unit 1530, a feature addition unit 1240, a switching unit 1740, a switching unit 1750, and a difference encoding index determination unit 1560.

The connection relation between the decoding unit 1110, the decoding unit 1510, the feature difference decoding unit 1530, and the feature addition unit 1240 is the same as that shown in FIG. 18. The code sequence demultiplexing unit 1700 receives a video descriptor, outputs a separated first feature code sequence to the decoding unit 1110, and also outputs a third feature code sequence to the switching unit 1740. Further, the code sequence demultiplexing unit 1700 outputs edge information to the difference encoding index determination unit 1560, and also outputs mode information to the switching unit 1740 and the switching unit 1750. The difference encoding index determination unit 1560 receives the edge information output from the code sequence demultiplexing unit 1700, and outputs difference encoding indexes to the switching unit 1740 and the switching unit 1750. The switching unit 1740 outputs the third feature code sequence output from the code sequence demultiplexing unit 1700 to either the feature difference decoding unit 1530 or the decoding unit 1510, according to the difference encoding index output from the difference encoding index determination unit 1560 or the mode information output from the code sequence demultiplexing unit 1700. The switching unit 1750 receives the addition result output from the feature addition unit 1240 and the decoding result output from the decoding unit 1510, reconstructs the second feature based on the difference encoding indexes output from the difference encoding index determination unit 1560 and the mode information output from the code sequence demultiplexing unit 1700, and outputs it.

Next, operation of the feature reproduction unit 1000 shown in FIG. 21 will be described.

A video descriptor on which matching is performed is first input to the code sequence demultiplexing unit 1700. The code sequence demultiplexing unit 1700 separates a first feature code sequence and a third feature code sequence from the video descriptor by means of a demultiplexing method corresponding to the method used for multiplexing. This operation is the same as that performed by the code sequence demultiplexing unit 1100 of the feature reproduction unit shown in FIG. 14. The separated first feature code sequence and the third feature code sequence are respectively output to the decoding unit 1110 and the switching unit 1740. The edge information, which is information describing the edge in the screen formed by black regions or an L-shaped region, is also demultiplexed from the video descriptor, and output to the difference encoding index determination unit 1560. Further, the mode information is also demultiplexed from the video descriptor and output to the switching unit 1740 and the switching unit 1750.

Operation of the difference encoding index determination unit 1560 is the same as the case of FIG. 18, and difference encoding indexes are output.

Operation of the decoding unit 1110 is the same as the case of FIG. 14, and a first feature is output. The first feature is also output to the feature addition unit 1240.

The switching unit 1740 changes the output destination of the third feature code sequence for each dimension of the feature, according to the difference encoding indexes output from the difference encoding index determination unit 1560 and the mode information output from the code sequence demultiplexing unit 1700. If the mode information indicates that the feature included in the third feature code sequence is a feature difference value, the switching unit 1740 outputs the third feature code sequence to the feature difference decoding unit 1530 with respect to the dimensions designated by the difference encoding indexes, while outputs third feature code sequence to the decoding unit 1510 with respect to the dimensions not designated by the difference encoding indexes. On the other hand, if the mode information indicates that the feather included in the third feature code sequence is a second feature, the switching unit 1740 outputs the third feature code sequence to the decoding unit 1510.

Operation of the feature difference decoding unit 1530, the feature addition unit 1240, and the decoding unit 1510 is the same as the case of FIG. 18

The switching unit 1750 switches the output destination of the second feature according to the difference encoding indexes output from the difference encoding index determination unit 1560 and the mode information output from the code sequence demultiplexing unit 1700. If the mode information indicates that the feature included in the third feature code sequence is a feature difference value, the switching unit 1750 outputs the addition result output from the feature addition unit 1240 as a second feature with respect to the dimensions included in the difference encoding indexes, while outputs the decoding result output from the decoding unit 1510 as a second feature with respect to the dimensions not included in the difference encoding indexes. On the other hand, if the mode information indicates that the feature included in the third feature code sequence is a second feature, the switching unit 1750 outputs the decoding result output from the decoding unit 1510 as a second feature.

The feature reproduction unit shown in FIG. 21 provides a means for separating the features combined by the feature combining unit 240 shown in FIG. 10.

Next, another embodiment of the feature reproduction unit 1000 shown in FIG. 13 will be described with reference to FIG. 22.

Figure 22:
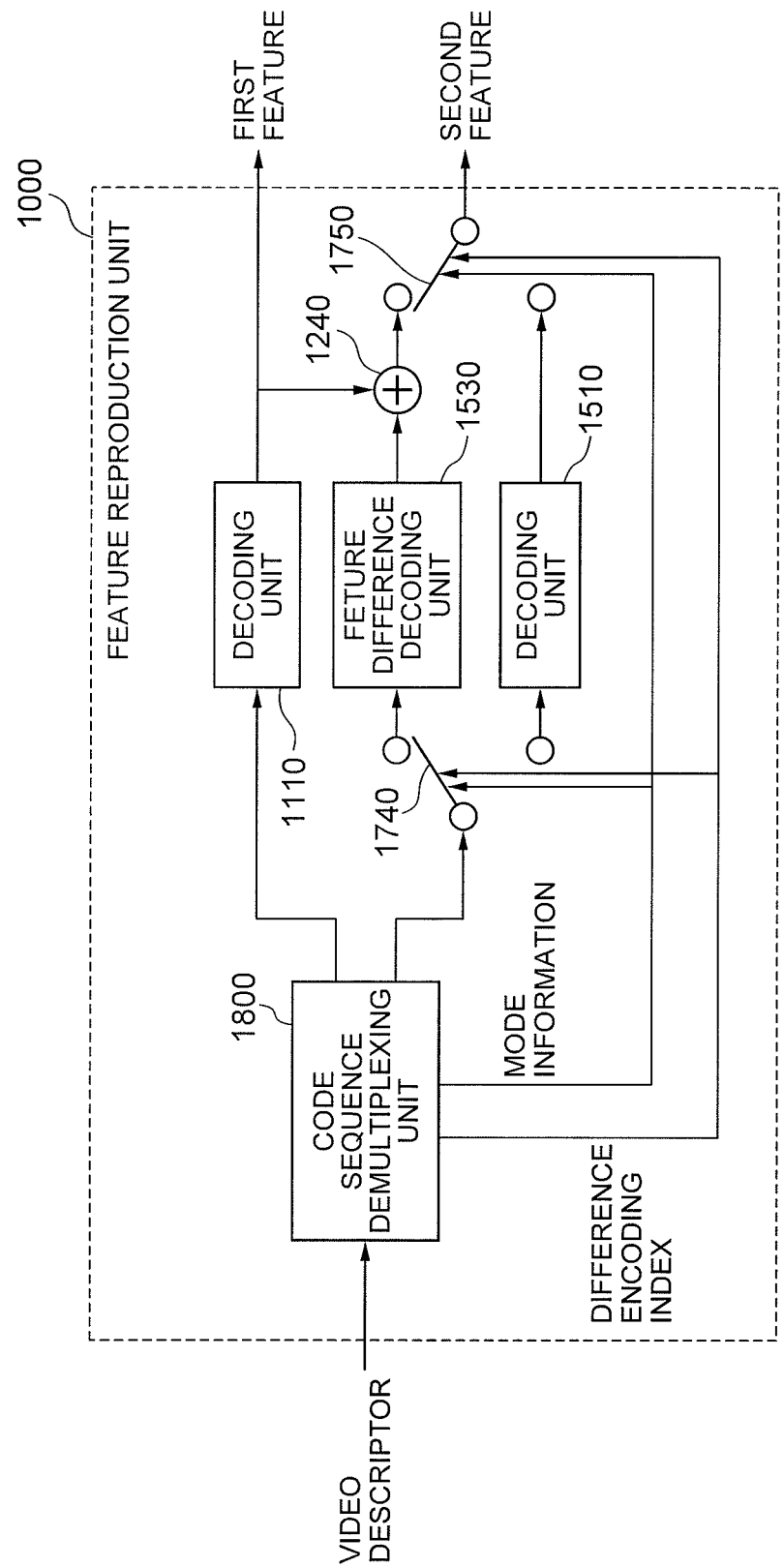
FIG. 22 is a block diagram showing the configuration of an embodiment of the feature reproduction unit 1000 shown in FIG. 13.

Referring to FIG. 22 showing an embodiment of the feature reproduction unit 1000 corresponding to the feature combining unit 240 shown in FIG. 11, the feature reproduction unit 1000 includes a code sequence demultiplexing unit 1800, a decoding unit 1110, a decoding unit 1510, a feature difference decoding unit 1530, a feature addition unit 1240, a switching unit 1740, and a switching unit 1750.

The configuration thereof is similar to that of the case of FIG. 20 except for the code sequence demultiplexing unit 1800, the switching unit 1740, and the switching unit 1750. The code sequence demultiplexing unit 1800 receives a video descriptor, outputs a separated first feature code sequence to the decoding unit 1110, and also outputs a third feature code sequence to the switching unit 1540. Further, the code sequence demultiplexing unit 1800 outputs difference encoding indexes and mode information to the switching unit 1740 and the switching unit 1750. The switching unit 1740 outputs the third feature code sequence output from the code sequence demultiplexing unit 1800 to either the feature difference decoding unit 1530 or the decoding unit 1510, according to the difference encoding index and the mode information output from the code sequence demultiplexing unit 1800. The switching unit 1750 receives the addition result output from the feature addition unit 1240 and the decoding result output from the decoding unit 1510, reconstructs the second feature based on the difference encoding indexes and the mode information output from the code sequence demultiplexing unit 1800, and outputs it.

Next, operation of the feature reproduction unit 1000 shown in FIG. 22 will be described.

Operation other than that of the code sequence demultiplexing unit 1800 is the same as the case shown in FIG. 21. Operation of the code sequence demultiplexing unit 1800 is also similar to that of the code sequence demultiplexing unit 1700 shown in FIG. 21 except for an aspect of demultiplexing a difference encoding indexes instead of edge information.

The feature reproduction unit 1000 shown in FIG. 22 provides a means for separating the features combined by the feature combining unit 240.

Next, another embodiment of the feature reproduction unit 1000 will be described with reference to FIG. 23.

Figure 23:
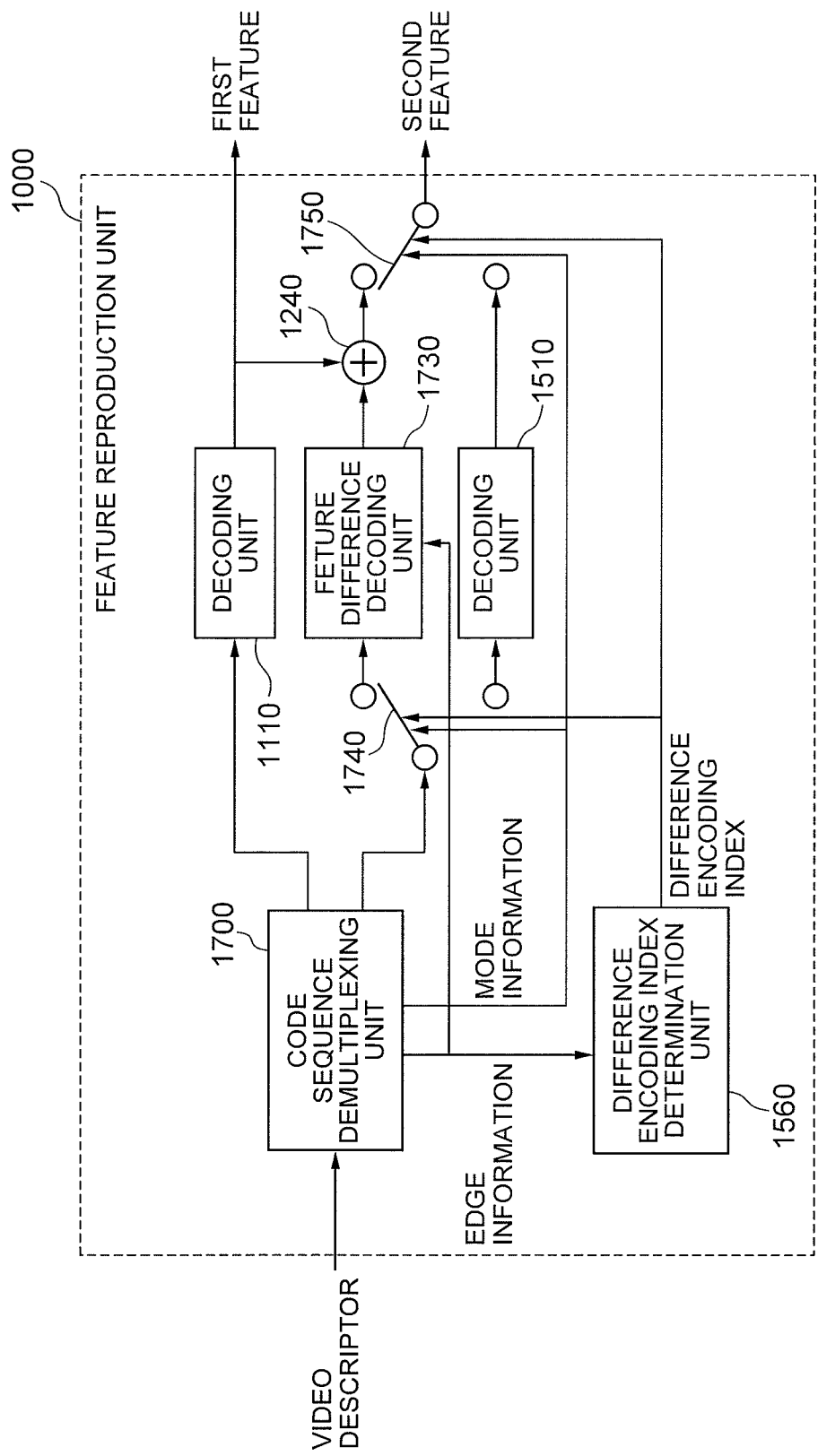
FIG. 23 is a block diagram showing the configuration of an embodiment of the feature reproduction unit 1000 shown in FIG. 13.

Referring to FIG. 23 showing an embodiment of the feature reproduction unit 1000 corresponding to the feature combining unit 240 shown in FIG. 12, the feature reproduction unit 1000 includes a code sequence demultiplexing unit 1700, a decoding unit 1110, a decoding unit 1510, a feature difference decoding unit 1530, a feature addition unit 1240, a switching unit 1740, a switching unit 1750, and a difference encoding index determination unit 1560.

The connection relation between the units other than the code sequence demultiplexing unit 1700 and the feature difference decoding unit 1730 is the same as that shown in FIG. 21. The code sequence demultiplexing unit 1700 receives a video descriptor, outputs a separated first feature code sequence to the decoding unit 1110, and also outputs a third feature code sequence to the switching unit 1540. Further, the code sequence demultiplexing unit 1700 outputs edge information to the difference encoding index determination unit 1560 and the feature difference decoding unit 1730, and outputs mode information to the switching unit 1740 and the switching unit 1750. The feature difference decoding unit 1730 receives the third feature code sequence output from the switching unit 1740 an the edge information output from the third feature code sequence, and outputs a feature difference value to the feature addition unit 1240.

Next, operation of the feature reproduction unit 1000 shown in FIG. 23 will be described.

Operation other than that of the feature difference decoding unit 1730 is the same as the case shown in FIG. 21. Operation of the feature difference decoding unit 1730 is also similar to that of the feature difference decoding unit 1530 shown in FIG. 21 except for an aspect of performing decoding by changing the coding parameter according to the edge information.

The feature reproduction unit shown in FIG. 23 provides a means for separating the features combined by the feature combining unit 240 shown in FIG. 12.

The embodiment of the moving image matching device has been described above. With this embodiment, it is possible to perform matching on moving images using a video descriptor extracted by the video descriptor generation device. As such, even if black bars or an L-shaped region is included, it is possible to perform matching without degrading the accuracy.

Next, operation of another embodiment of the present invention will be described.

Figure 26:
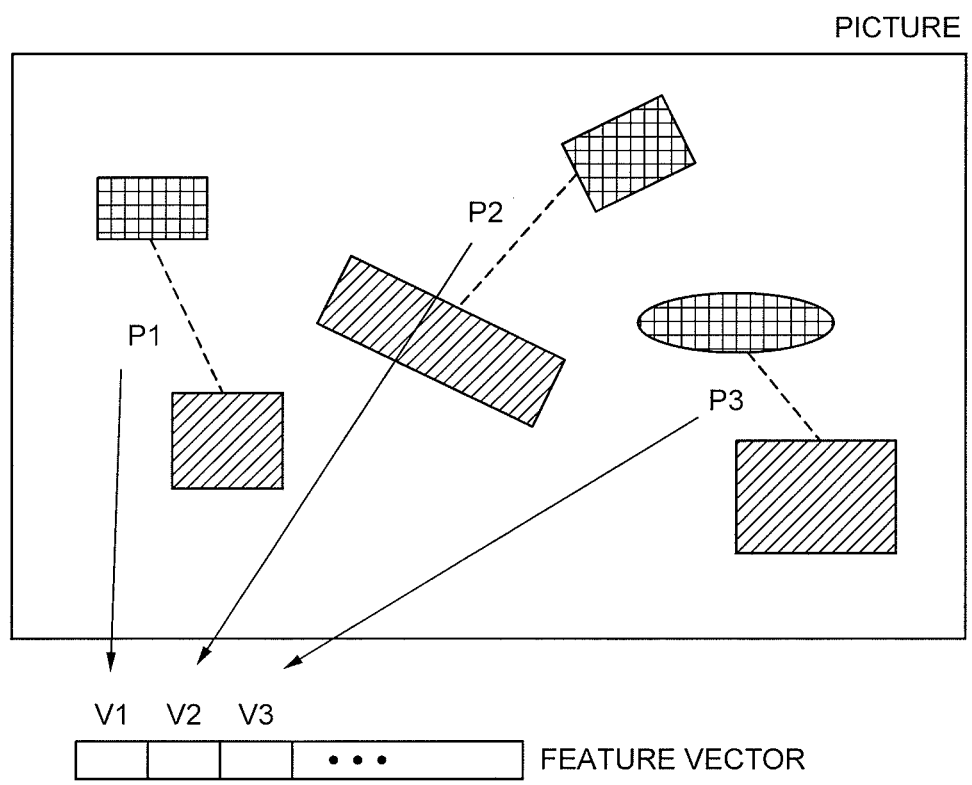
FIG. 26 illustrates examples of features.
Figure 27:
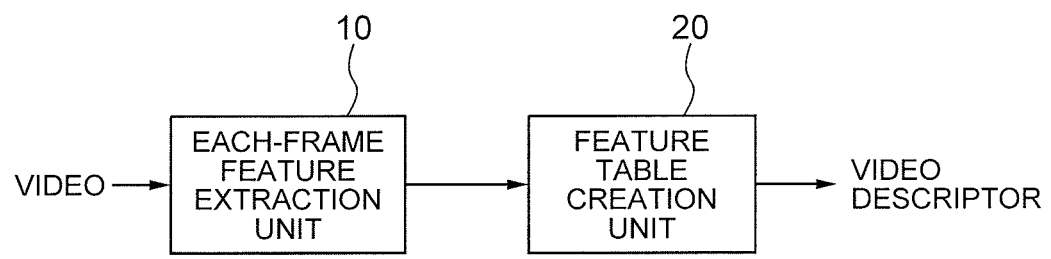
FIG. 27 is a block diagram showing the configuration of a video descriptor generation device related to the present invention.

FIG. 26 shows an exemplary method of extracting features from a picture. In this method, pairs of any two regions within a picture are set beforehand, and a difference between the features of the two regions of a pair is obtained as a feature vector. In this embodiment, respective pairs of regions are indicated as P1, P2, P3, . . . , and a feature determined from the $n^{th}$ pair is indicated as Vn. Pairs of regions may take various combinations of shapes and positions of regions, as shown in the figure. Also, various methods can be used for calculating the feature Vn from the pair Pn. For example, there is a method in which an average value of luminance is calculated in each of a shaded region and a reticulated region of a pair, and a value of the feature Vn is determined from the magnitude relation thereof. Specifically, an average luminance obtained within a reticulated region is subtracted from an average luminance obtained within a shaded region to calculate a difference, and if the difference is positive, $Vn=1$, while if the difference is negative, $Vn=-1$. It is also possible that if the absolute value of the difference is smaller than a threshold, Vn is zero, so that the feature Vn is indicated by a ternary values. Hereinafter, it is assumed that Vn takes a ternary value The visual feature extraction unit 120 in FIG. 1 performs the above-described processing on the N pieces of pairs, to thereby obtain feature vectors Vn in N dimensions. The video edge detection unit 100 performs Hough transform on each picture, to detect horizontal or vertical lines close to the edge of the video. Then, the video edge detection unit 100 measures continuity between the pictures, and if they continue for the number of pictures which is larger than a threshold, detects them as boundaries of black bar regions or L-shaped regions, and outputs edge information. The position-corrected visual feature extraction unit 130 regards the region excluding the edge region as the entire screen to perform the same processing as that performed by the visual feature extraction unit 120 to thereby obtain feature vectors V'n of the N dimensions. The feature combining unit 140 or 240 combines the feature vectors Vn and V'n of the N dimensions obtained for each picture to generate a video descriptor.

With respect to the feature vector Vn, the encoding unit 320 performs encoding. As each dimension takes a ternary value, if they are combined for 5 dimensions, the state is $3^5=243$, which can be represented in one byte. As such, they are represented for each 5 dimensions, the value of which is represented as N/5 byte, and encoded.

If the feature combining unit 140 calculates a feature difference value, a difference value Dn between the features of each dimension is calculated by the equation $$Dn=V'n-Vn$$

and the difference value Dn is encoded. As the value of the feature takes a ternary value, the value taken as Dn is a ternary value, although it depends on Vn. As such, if $Vn=1$, $Dn=0, -1$, or $-2$, if $Vn=0$, $Dn=1, 0$, or $-1$, if $Vn=-1$, $Dn=2, 1$, or $0$. The feature difference value encoding unit 340 learns occurrence frequency of Dn for each of the values of $Vn=1, 0$, and $-1$ in advance, and performs entropy coding based on the result.

If difference indexes are determined as in the case of FIG. 7, it is possible to consider to what degree the region used for calculating Vn moves due to insertion of black bar regions or an L-shaped region. A region at the center of the screen does not move largely even if black bar regions are inserted. On the other hand, a region in the surrounding area of the image shifts largely. As such, if the region used for calculating Vn is close to the center of the screen, the correlation between Vn and V'n is larger, while if the region used for calculating Vn is close to the surrounding area, the correlation is lower. Accordingly, for dimensions in which Vn is calculated from regions at the center of the screen, it is possible to encode Dn, and for other dimensions, it is possible to encode V'n. As described above, dimensions for which difference encoding should be performed can be obtained from the geometric characteristics, and difference encoding indexes can be determined. Of course, it is possible to determine difference encoding indexes from a degree of correlation between Vn and V'n by learning it with respect to images.

For other cases, it is possible to construct video descriptor generation devices with respect to the above-described features by applying the above-described methods.

While the invention has been described with reference to the embodiments thereof, the invention is not limited to these examples. It will be understood by those skilled in the art that various changes in form and details may be made therein without departing from the scope of the present invention. Further, the video descriptor generation device and the moving image matching device of the present invention are adapted such that the functions thereof can be realized by computers and programs, as well as hardware. Such a program is provided in the form of being written on a computer readable recording medium such as a magnetic disk, a semiconductor memory, or the like, is read by a computer when the computer is started for example, and controls operation of the computer, to thereby allow the computer to function as the video descriptor generation device and the moving image matching device of the above-described embodiments.

This application is based upon and claims the benefit of priority from Japanese patent application No. 2009-12812, filed on Jan. 23, 2009, the disclosure of which is incorporated herein in its entirety by reference.

INDUSTRIAL APPLICABILITY

The present invention is applicable to retrieval of similar or identical videos from various videos with high accuracy. In particular, regarding retrieval of the same segments of videos, the present invention is applicable to identification of illegally copied moving images distributed on the networks and identification of commercials distributed on actual airwaves.

The invention claimed is:

1. A moving image matching device for performing matching between a first video descriptor of a first video and a second video descriptor of a second video, the device comprising:
 a first feature reproduction unit implemented by at least a processor and that reproduces, from the first video descriptor, a first feature of the first video extracted for each picture which is a frame or a field of the first video, and a second feature of the first video extracted from a region defined by an edge of an image included in the first video;
 a second feature reproduction unit implemented by at least a processor and that reproduces, from the second video descriptor, a first feature of the second video extracted for each picture which is a frame or a field of the second video, and a second feature of the second video extracted from a region defined by an edge of an image included in the second video;
 a first feature matching unit implemented by at least a processor and that performs matching between the first feature of the first video and the first feature of the second video to calculate a first matching score;
 a second feature matching unit implemented by at least a processor and that performs matching between the first feature of the first video and the second feature of the second video to calculate a second matching score;
 a third feature matching unit implemented by at least a processor and that performs matching between the second feature of the first video and the first feature of the second video to calculate a third matching score;
 a fourth feature matching unit implemented by at least a processor and that performs matching between the second feature of the first video and the second feature of the second video to calculate a fourth matching score; and
 a selection unit implemented by at least a processor and that compares the first to fourth matching scores to select a best matching score.

2. The moving image matching device, according to claim 1, wherein
 the first feature reproduction unit and the second feature reproduction unit include:
 a code sequence demultiplexing unit implemented by at least a processor and that demultiplexes the first video descriptor or the second video descriptor to generate a first feature code sequence obtained by encoding the first feature of the first video or the second video extracted for each picture which is a frame or a field of the first video or the second video, and a second feature code sequence obtained by encoding the second feature of the first video or the second video extracted from the region defined by the edge of the image included in the first video or the second video;
 a first decoding unit implemented by at least a processor and that decodes the first feature code sequence to reproduce the first feature of the first video or the second video; and
 a second decoding unit implemented by at least a processor and that decodes the second feature code sequence to reproduce the second feature of the first video or the second video.

3. The moving image matching device, according to claim 1, wherein
 the first feature reproduction unit and the second feature reproduction unit include:
 a code sequence demultiplexing unit implemented by at least a processor and that demultiplexes the first video descriptor or the second video descriptor to generate a first feature code sequence obtained by encoding the first feature of the first video or the second video extracted for each picture which is a frame or a field of the first video or the second video, and a feature difference value code sequence obtained by encoding a feature difference value calculated by subtracting the first feature of the first video or the second video from the second feature of the first video or the second video extracted from the region defined by the edge of the image included in the first video or the second video;
 a first decoding unit implemented by at least a processor and that decodes the first feature code sequence to reproduce the first feature of the first video or the second video;
 a feature difference decoding unit implemented by at least a processor and that decodes the feature difference value code sequence to reproduce the feature difference value; and
 an addition unit implemented by at least a processor and that adds the first feature to the feature difference value to calculate the second feature of the first video or the second video.

4. The moving image matching device, according to claim 3, wherein
 the code sequence demultiplexing unit also demultiplexes the edge information, and
 the feature difference decoding unit decodes the feature difference value code sequence based on the edge information to reproduce the feature difference value.

5. The moving image matching device, according to claim 1, wherein
 the first feature reproduction unit and the second feature reproduction unit include:
 a code sequence demultiplexing unit implemented by at least a processor and that demultiplexes the first video descriptor or the second video descriptor to generate:
 a first feature code sequence obtained by encoding the first feature of the first video or the second video extracted for each picture which is a frame or a field of the first video or the second video;
 a third feature code sequence including one, having a smaller code quantity, of a second feature code sequence obtained by encoding the second feature of the first video or the second video extracted from the region defined by the edge of the image included in the first video or the second video and a feature difference value code sequence obtained by encoding a feature difference value calculated by subtracting the first feature of the first video or the second video from the second feature; and mode information indicating whether the feature included in the third feature code sequence is the feature difference value or the second feature;

a first decoding unit implemented by at least a processor and that decodes the first feature code sequence to reproduce the first feature of the first video or the second video;

a first switching unit implemented by at least a processor and that receives the third feature code sequence, and switches an output destination of the third feature code sequence based on the mode information;

a feature difference decoding unit implemented by at least a processor and that decodes the third feature code sequence output from the first switching unit to reproduce the feature difference value;

a second decoding unit implemented by at least a processor and that decodes the third feature code sequence output from the first switching unit to reproduce the second feature;

an addition unit implemented by at least a processor and that adds the first feature to the feature difference value to calculate the second feature; and a second switching unit implemented by at least a processor and that combines the second feature output from the addition unit and the second feature output from the second decoding unit while performing switching according to the mode information, and outputs the second feature of the first video or the second video.

6. The moving image matching device, according to claim 1, wherein the first feature reproduction unit and the second feature reproduction unit include:

a code sequence demultiplexing unit implemented by at least a processor and that demultiplexes the first video descriptor or the second video descriptor, and outputs:

one of the edge information and a difference encoding index which is information determined from the edge information and indicates an index of an element to which difference encoding is applied among respective elements of a feature vector;

a first feature code sequence obtained by encoding the first feature of the first video or the second video extracted for each picture which is a frame or a field of the first video or the second video; and a third feature code sequence including one, determined by the edge information or the difference encoding index information, of a second feature code sequence obtained by encoding the second feature of the first video or the second video extracted from a region defined by an edge of an image included in the first video or the second video, and a feature difference value code sequence obtained by encoding a feature difference value calculated by subtracting the first feature of the first video or the second video extracted for each picture which is a frame or a field of the first video or the second video from the second feature;

a difference encoding index determination unit implemented by at least a processor and that determines, if the code sequence demultiplexing unit outputs the edge information, an index of an element to which difference encoding is applied among the respective elements of the feature vector from the edge information, and outputs it as the difference encoding index information;

a first decoding unit implemented by at least a processor and that decodes the first feature code sequence to reproduce the first feature of the first video or the second video;

a first switching unit implemented by at least a processor and that receives the third feature code sequence and switches an output destination of the third feature code sequence based on the difference index information;

a feature difference decoding unit implemented by at least a processor and that decodes the third feature code sequence output from the first switching unit to reproduce the feature difference value;

a second decoding unit implemented by at least a processor and that decodes the third feature code sequence output from the first switching unit to reproduce the second feature;

an addition unit implemented by at least a processor and that adds the first feature to the feature difference value to calculate the second feature; and a second switching unit implemented by at least a processor and that combines the second feature output from the addition unit and the second feature output from the second decoding unit while performing switching according to the difference encoding index information, and outputs the second feature of the first video or the second video.

7. The moving image matching device, according to claim 1, wherein the first feature reproduction unit and the second feature reproduction unit include:

a code sequence demultiplexing unit implemented by at least a processor and that demultiplexes the first video descriptor or the second video descriptor, and outputs:

one of the edge information and a difference encoding index which is information determined from the edge information and indicates an index of an element to which difference encoding is applied among respective elements of a feature vector;

a first feature code sequence obtained by encoding the first feature of the first video or the second video extracted for each picture which is a frame or a field of the first video or the second video;

a third feature code sequence including, of a second feature code sequence and a feature difference code sequence, the second feature code sequence for an element of an index which is not designated in the difference encoding index information, while including one of the second feature code sequence and the feature difference code sequence having a smaller code quantity for the element of the index designated in the difference encoding index information, the second feature code sequence being obtained by encoding the second feature of the first video or the second video extracted from a region where a video actually exists within a picture of the first video or the second video defined by using the edge information indicating an edge of the image detected from the first video or the second video, and the feature difference code sequence being obtained by encoding a feature difference value calculated by subtracting the first feature of the first video or the second video from the second feature; and mode information indicating whether the second feature code sequence or the feature difference code sequence is included for the element of the index designated in the difference encoding index information;

a difference encoding index determination unit implemented by at least a processor and that determines, if the code sequence demultiplexing unit outputs the edge information, an index of an element to which difference encoding is applied among the respective elements of the feature vector from the edge information, and outputs it as the difference encoding index information;

a first decoding unit implemented by at least a processor and that decodes the first feature code sequence to reproduce the first feature of the first video or the second video;

a first switching unit implemented by at least a processor and that receives the third feature code sequence and switches an output destination of the third feature code sequence based on the difference encoding index information and the mode information;

a feature difference decoding unit implemented by at least a processor and that decodes the third feature code sequence output from the first switching unit to reproduce the feature difference value;

a second decoding unit implemented by at least a processor and that decodes the third feature code sequence output from the first switching unit to reproduce the second feature;

an addition unit implemented by at least a processor and that adds the first feature to the feature difference value to calculate the second feature; and a second switching unit implemented by at least a processor and that combines the second feature output from the addition unit and the second feature output from the second decoding unit while performing switching according to the difference index information and the mode information, and outputs the second feature of the first video or the second video.

8. The moving image matching device, according to claim 6, wherein
the feature difference decoding unit decodes the feature difference value code sequence based on the edge information to reproduce the feature difference value.

9. A moving image matching method, comprising:
reproducing, from a first video descriptor, a first feature of a first video extracted for each picture which is a frame or a field of the first video, and a second feature of the first video extracted from a region defined by an edge of an image included in the first video;
reproducing, from a second video descriptor, a first feature of a second video extracted for each picture which is a frame or a field of the second video, and a second feature of the second video extracted from a region defined by an edge of an image included in the second video;
performing matching between the first feature of the first video and the first feature of the second video to calculate a first matching score;
performing matching between the first feature of the first video and the second feature of the second video to calculate a second matching score;
performing matching between the second feature of the first video and the first feature of the second video to calculate a third matching score;
performing matching between the second feature of the first video and the second feature of the second video to calculate a fourth matching score; and
comparing the first to fourth matching scores to select a best matching score.

10. The moving image matching method, according to claim 9, wherein the reproducing the first feature and the second feature of the first video and the second video includes:
demultiplexing the first video descriptor or the second video descriptor to generate a first feature code sequence obtained by encoding the first feature of the first video or the second video extracted for each picture which is a frame or a field of the first video or the second video, and a second feature code sequence obtained by encoding the second feature of the first video or the second video extracted from the region defined by the edge of the image included in the first video or the second video;
decoding the first feature code sequence to reproduce the first feature of the first video or the second video; and
decoding the second feature code sequence to reproduce the second feature of the first video or the second video.

11. The moving image matching method, according to claim 9, wherein the reproducing the first feature and the second feature of the first video and the second video includes:
demultiplexing the first video descriptor or the second video descriptor to generate a first feature code sequence obtained by encoding the first feature of the first video or the second video extracted for each picture which is a frame or a field of the first video or the second video, and a feature difference value code sequence obtained by encoding a feature difference value calculated by subtracting the first feature of the first video or the second video from the second feature of the first video or the second video extracted from the region defined by the edge of the image included in the first video or the second video;
decoding the first feature code sequence to reproduce the first feature of the first video or the second video;
decoding the feature difference value code sequence to reproduce the feature difference value; and
adding the first feature to the feature difference value to calculate the second feature of the first video or the second video.

12. The moving image matching method, according to claim 11, wherein
the demultiplexing includes demultiplexing the edge information, and
the decoding the second feature code sequence includes decoding the feature difference value code sequence based on the edge information to reproduce the feature difference value.

13. The moving image matching method, according to claim 9, wherein the reproducing the first feature and the second feature of the first video and the second video includes:
demultiplexing the first video descriptor or the second video descriptor to generate:
a first feature code sequence obtained by encoding the first feature of the first video or the second video extracted for each picture which is a frame or a field of the first video or the second video;
a third feature code sequence including one, having a smaller code quantity, of a second feature code sequence obtained by encoding the second feature of the first video or the second video extracted from the region defined by the edge of the image included in the first video or the second video and a feature difference value code sequence obtained by encoding a feature difference value calculated by subtracting the first feature of the first video or the second video from the second feature; and
mode information indicating whether the feature included in the third feature code sequence is the feature difference value or the second feature;
decoding the first feature code sequence to reproduce the first feature of the first video or the second video;

receiving the third feature code sequence, and switching an output destination of the third feature code sequence based on the mode information;
decoding the output third feature code sequence to reproduce the feature difference value;
decoding the output third feature code sequence to reproduce the second feature;
adding the first feature to the feature difference value to calculate the second feature; and
combining the second feature reproduced by decoding the third feature code sequence and the second feature calculated by adding the first feature to the feature difference value while performing switching according to the mode information, and outputting the second feature of the first video or the second video.

14. The moving image matching method, according to claim 9, wherein the reproducing the first feature and the second feature of the first video and the second video includes:
demultiplexing the first video descriptor or the second video descriptor, and outputting:
one of the edge information and a difference encoding index which is information determined from the edge information and indicates an index of an element to which difference encoding is applied among respective elements of a feature vector;
a first feature code sequence obtained by encoding the first feature of the first video or the second video extracted for each picture which is a frame or a field of the first video or the second video; and
a third feature code sequence including one, determined by the edge information or the difference encoding index information, of a second feature code sequence obtained by encoding the second feature of the first video or the second video extracted from a region defined by an edge of an image included in the first video or the second video, and a feature difference value code sequence obtained by encoding a feature difference value calculated by subtracting the first feature of the first video or the second video extracted for each picture which is a frame or a field of the first video or the second video from the second feature;
if the edge information is output, determining an index of an element to which difference encoding is applied among the respective elements of the feature vector from the edge information, and outputting it as the difference encoding index information;
decoding the first feature code sequence to reproduce the first feature of the first video or the second video;
receiving the third feature code sequence and switching an output destination of the third feature code sequence based on the difference index information;
decoding the output third feature code sequence to reproduce the feature difference value;
decoding the output third feature code sequence to reproduce the second feature;
adding the first feature to the feature difference value to calculate the second feature; and
combining the second feature reproduced by decoding the third feature code sequence and the second feature calculated by adding the first feature to the feature difference value while performing switching according to the difference encoding index information, and outputting the second feature of the first video or the second video.

15. The moving image matching method, according to claim 9, wherein the reproducing the first feature and the second feature of the first video and the second video includes:
demultiplexing the first video descriptor or the second video descriptor, and outputting:
one of the edge information and a difference encoding index which is information determined from the edge information and indicates an index of an element to which difference encoding is applied among respective elements of a feature vector;
a first feature code sequence obtained by encoding the first feature of the first video or the second video extracted for each picture which is a frame or a field of the first video or the second video;
a third feature code sequence including, of a second feature code sequence and a feature difference code sequence, the second feature code sequence for an element of an index which is not designated in the difference encoding index information, while including one of the second feature code sequence and the feature difference code sequence having a smaller code quantity for the element of the index designated in the difference encoding index information, the second feature code sequence being obtained by encoding the second feature of the first video or the second video extracted from a region where a video actually exists within a picture of the first video or the second video defined by using the edge information indicating an edge of the image detected from the first video or the second video, and the feature difference code sequence being obtained by encoding a feature difference value calculated by subtracting the first feature of the first video or the second video from the second feature; and
mode information indicating whether the second feature code sequence or the feature difference code sequence is included for the element of the index designated in the difference encoding index information;
if the edge information is output, determining an index of an element to which difference encoding is applied among the respective elements of the feature vector from the edge information, and outputting it as the difference encoding index information;
decoding the first feature code sequence to reproduce the first feature of the first video or the second video;
receiving the third feature code sequence and switching an output destination of the third feature code sequence based on the difference encoding index information and the mode information;
decoding the output third feature code sequence to reproduce the feature difference value;
decoding the output third feature code sequence to reproduce the second feature;
adding the first feature to the feature difference value to calculate the second feature; and
combining the second feature reproduced by decoding the third feature code sequence and the second feature calculated by adding the first feature to the feature difference value while performing switching according to the difference index information and the mode information, and outputting the second feature of the first video or the second video.

16. The moving image matching method, according to claim 14, wherein the reproducing the feature difference value by decoding the third feature code sequence includes decoding the feature difference value code sequence based on the edge information to reproduce the feature difference value.

17. A video descriptor extraction device, comprising:
a first extraction unit implemented by at least a processor and that extracts a first feature from a first region, for each picture, the first region being an entire frame or an entire field of a video;
a second extraction unit implemented by at least a processor and that extracts a second feature from a region, for the each picture, the second region being defined by an edge of an image included in the first region; and
a feature combining unit implemented by at least a processor and that extracts a video descriptor including the first multi-dimensional vector calculated from the first feature and a second multi-dimensional vector calculated from the second feature, and wherein
the first extraction unit and the second extraction unit form the features based on a difference value between region features calculated from two sub-regions associated with each dimension composing the feature.

18. The video descriptor extraction device, according to claim 17, wherein
the first feature extracted by the first extraction unit and the second feature extracted by the second extraction unit are features of a same type.

19. The video descriptor extraction device, according to claim 17, wherein
the edge of the image is an edge of an image defined by at least one of addition of a black bar region, addition of an L-shape region, and a picture-in-picture region.

20. The video descriptor extraction device, according to claim 17, wherein
the first extraction unit and the second extraction unit quantize a difference value between the region features as a value for each dimension of the feature.

21. The video descriptor extraction device, according to claim 20, wherein
the first extraction unit and the second extraction unit quantize the difference value into a ternary value as the value for each dimension of the feature, and wherein
the feature combining unit extracts a representation of the feature by encoding five values of the dimensions into 1 byte data.

22. A video descriptor extraction method, comprising:
extracting a first feature from a first region, for each picture, the first region being an entire frame or an entire field of a video;
extracting a second feature from a second region, for each picture, the second region being defined by an edge of an image included the first region; and
extracting a video descriptor including a first multi-dimensional vector calculated from the first feature and a second multi-dimensional vector calculated from the second feature, and wherein
the extracting the feature includes forming the feature based on a difference value between region features calculated from two sub-regions associated with each dimension composing the feature.

23. The video descriptor extraction method, according to claim 22, wherein
the first feature and the second feature are features of a same type.

24. The video descriptor extraction method, according to claim 22, wherein
the edge of the image is an edge of an image defined by at least one of addition of a black bar region, addition of an L-shape region, and a picture-in-picture region.

25. The video descriptor extraction method, according to claim 22, wherein
the extracting the feature includes quantizing a difference value between the region features as a value for each dimension of the feature.

26. The video descriptor extraction method, according to claim 25, wherein
the extracting the feature includes quantizing the difference value into a ternary value as the value for each dimension of the feature, and wherein
the feature combining unit extracts a representation of the feature by encoding five values of the dimensions into 1 byte data.

27. A non-transitory computer-readable medium storing a program comprising instructions for causing a computer to function as:
a first extraction unit that extracts a first feature from a first region, for each picture, the first region being an entire frame of a video;
a second extraction unit that extracts a second feature from a second region, for the each picture, the second region being defined by an edge of an image included in the first region; and
a feature combining unit that extracts a video descriptor from a first multi-dimensional vector calculated from the first feature and a second multi-dimensional vector calculated from the second feature, and wherein
the first extraction unit and the second extraction unit form the feature based on a difference value between region features calculated from two sub-regions associated with each dimension composing the feature.

* * * * *